US010215007B2

(12) United States Patent
Bansal

(10) Patent No.: US 10,215,007 B2
(45) Date of Patent: Feb. 26, 2019

(54) CONSOLIDATION OF PROPPANT IN HYDRAULIC FRACTURES

(71) Applicant: MAERSK OLIE OG GAS A/S, Copenhagen K (DK)

(72) Inventor: Bhagwan Dass Bansal, Copenhagen (DK)

(73) Assignee: Maersk Olie OG Gas A/S, Copenhagen K (DK)

( * ) Notice: Subject to any disclaimer, the term of this patent is extended or adjusted under 35 U.S.C. 154(b) by 0 days.

(21) Appl. No.: 15/106,981

(22) PCT Filed: Dec. 17, 2014

(86) PCT No.: PCT/EP2014/078334
§ 371 (c)(1),
(2) Date: Jun. 21, 2016

(87) PCT Pub. No.: WO2015/091712
PCT Pub. Date: Jun. 25, 2015

(65) Prior Publication Data
US 2016/0355725 A1 Dec. 8, 2016

(30) Foreign Application Priority Data

Dec. 20, 2013 (GB) .................................. 1322756.6

(51) Int. Cl.
*E21B 43/26* (2006.01)
*C09K 8/57* (2006.01)
(Continued)

(52) U.S. Cl.
CPC .............. *E21B 43/26* (2013.01); *C09K 8/575* (2013.01); *C09K 8/62* (2013.01); *E21B 43/267* (2013.01)

(58) Field of Classification Search
None
See application file for complete search history.

(56) References Cited

U.S. PATENT DOCUMENTS

| 4,002,204 A | 1/1977 | Cavin |
| 4,232,740 A | 11/1980 | Park |

(Continued)

FOREIGN PATENT DOCUMENTS

| EP | 2017321 A1 | 1/2009 |
| GB | 1327735 A | 8/1973 |

(Continued)

OTHER PUBLICATIONS

Irwin W. Sizer, "The Activation Energy of Urea Hydrolysis Catalyzed by Soy Bean Urease", J. Biol. Chem., vol. 132 1940, pp. 209-218.

(Continued)

*Primary Examiner* — Anuradha Ahuja
(74) *Attorney, Agent, or Firm* — Harness, Dickey & Pierce, P.L.C.

(57) ABSTRACT

A method for consolidating a proppant in a formation comprises injecting in the formation a composition comprising an enzyme and a substrate. The enzyme and the substrate may react, optionally in the presence of a precipitating compound, to form a solid precipitate on the surface of proppant particles to consolidate the proppant in situ, e.g., in one or more fractures of the formation.

30 Claims, 16 Drawing Sheets

(51) Int. Cl.
*C09K 8/62* (2006.01)
*C09K 8/575* (2006.01)
*E21B 43/267* (2006.01)

(56) References Cited

U.S. PATENT DOCUMENTS

| | | |
|---|---|---|
| 4,785,884 A | 11/1988 | Armbruster |
| 5,088,555 A | 2/1992 | Shu |
| 5,101,901 A | 4/1992 | Shu et al. |
| 5,143,155 A | 9/1992 | Ferris et al. |
| 5,604,184 A | 2/1997 | Ellis et al. |
| 5,730,873 A | 3/1998 | Hapka et al. |
| 5,924,488 A | 7/1999 | Nguyen et al. |
| 6,401,819 B1 * | 6/2002 | Harris .................. C09K 8/506 166/270 |
| 6,582,819 B2 | 6/2003 | McDaniel et al. |
| 6,705,400 B1 | 3/2004 | Nguyen et al. |
| 6,877,560 B2 | 4/2005 | Nguyen et al. |
| 7,044,224 B2 | 5/2006 | Nguyen |
| 7,841,804 B2 | 11/2010 | Ostvold et al. |
| 7,963,330 B2 | 6/2011 | Nguyen et al. |
| 7,975,764 B2 | 7/2011 | Sullivan et al. |
| 8,124,571 B2 | 2/2012 | Harris et al. |
| 8,136,595 B2 | 3/2012 | Weaver et al. |
| 2005/0006093 A1 * | 1/2005 | Nguyen .................. C09K 8/62 166/281 |
| 2008/0108519 A1 | 5/2008 | Harris et al. |
| 2009/0044945 A1 * | 2/2009 | Willberg ............... C09K 8/706 166/308.1 |
| 2012/0261126 A1 | 10/2012 | Welton et al. |
| 2012/0269584 A1 * | 10/2012 | Ostvold ............... C09K 8/5045 405/264 |
| 2014/0303049 A1 * | 10/2014 | Holdsworth ............ C09K 8/56 507/241 |
| 2015/0297815 A1 * | 10/2015 | Meinander ........... A61M 1/284 604/28 |

FOREIGN PATENT DOCUMENTS

| | | |
|---|---|---|
| WO | WO-2005/124099 A1 | 12/2005 |
| WO | WO-2006/038016 A1 | 4/2006 |
| WO | WO2008119620 * | 3/2008 ............. C09K 8/506 |
| WO | WO-2008/119620 A1 | 10/2008 |
| WO | WO-2009/008724 A1 | 1/2009 |
| WO | WO-2009/078745 A1 | 6/2009 |
| WO | WO-2009/088315 A1 | 7/2009 |
| WO | WO-2011/078690 A1 | 6/2011 |
| WO | WO2013/064823 * | 5/2013 ............. C09K 8/56 |
| WO | WO-2013/064823 A1 | 5/2013 |

OTHER PUBLICATIONS

International Search Report PCT/ISA/210 for International Application No. PCT/EP2014/078334 dated Mar. 13, 2015.
Written Opinion of the International Searching Authority PCT/ISA/237 for International Application No. PCT/EP2014/078334 dated Mar. 13, 2015.

* cited by examiner

CONSOLIDATION OF PROPPANT IN HYDRAULIC FRACTURES

CROSS-REFERENCE TO RELATED APPLICATIONS

This application is a national phase under 35 U.S.C. § 371 of PCT International Application No. PCT/EP2014/078334 which has an International filing date of Dec. 17, 2014, which claims priority to Great Britain Patent Application No. 1322756.6, filed Dec. 20, 2013, the entire contents of each of which are hereby incorporated by reference.

FIELD OF THE INVENTION

The present invention relates to methods and systems for consolidating proppant particles in subterranean formation fractures.

BACKGROUND TO THE INVENTION

Hydraulic fracturing, also known as fracking, is a known process which allows creation of fractures from a wellbore into a formation or reservoir. This technique consists of pumping hydraulic fluid into a wellbore at a pressure and injection rate such that fractures are created into the formation. These fractures act as channels which facilitate and increase production of hydrocarbons, e.g. oil, from the formation into the wellbore.

In order to prevent closure or collapse of these fractures under reservoir conditions when the hydraulic fracture pressure is released, it is known to inject solid particles known as proppants into the created fractures, either during, or after, fracturing. The proppants act to "prop" open the fractures once the hydraulic fracturing has ceased.

A number of materials can be used as proppants, including sand particles such as natural sand particles and/or resin-coated sand particles, ceramic beads, glass beads, and the like.

A problem with the use of proppants is that, during subsequent production of the formation, flow of hydrocarbons and/or of aqueous fluids tends to cause a significant amount of proppant to be produced back into the wellbore, potentially damaging equipment, and requiring separation from the produced hydrocarbons.

Various attempts have been made to seek to consolidate proppants in the formed fractures. Such attempts have been disclosed for example in GB 1,327,735 (Texaco Development Corp), U.S. Pat. No. 6,582,819 (Borden Chemical Inc), U.S. Pat. No. 7,044,224 (Halliburton Energy Services Inc), which disclose the use of a cement composition to cement the proppants in place. Other attempts have been disclosed for example in US 2012/0261126 Halliburton Energy Services Inc. U.S. Pat. No. 4,785,884 (Acme Resin Corp.), U.S. Pat. No. 5,604,184 (Texaco Inc.), U.S. Pat. No. 5,924,488 (Halliburton Energy Services Inc), U.S. Pat. No. 6,705,400 (Halliburton Energy Services Inc), U.S. Pat. No. 6,877,560 (Halliburton Energy Services Inc.), U.S. Pat. No. 7,963,330 (Halliburton Energy Services Inc.), U.S. Pat. No. 8,136,595 (Halliburton Energy Services Inc.), WO 2009/078745 (Schlumberger Holdings Limited), and WO 2009/088315 (Schlumberger Holdings Limited), which disclose the use of a polymeric resin to bind the proppants in place. However, a problem with the above prior art methods is that the binder material, whether a cement or a polymeric resin, significantly reduces the permeability of the fractures, thus reducing production rates. Another problem is that, if pumped wrongly, such binder materials cannot be removed from the well and may damage the well permanently.

It is also known to use enzymes systems, whereby calcium carbonate is precipitated in situ, in methods of sealing or plugging subterranean formations, as disclosed for example in WO 2008/119620 (Maersk), WO 2005/124099 (Statoil), US 2012/0269584 (Temasi AS), U.S. Pat. No. 7,841,804 (Impermeable AS), WO 2009/008724 (Stichting Deltares), U.S. Pat. No. 4,232,740 (Texaco Development Corp), U.S. Pat. No. 5,088,555 (Mobil Oil Corp), U.S. Pat. No. 5,101,901 (Mobil Oil Corp.), U.S. Pat. No. 7,975,764 (Schlumberger Technology Corp.), U.S. Pat. No. 8,124,571 (Cleansorb Limited). However, these documents only disclose using such enzyme systems in order to reduce water production by reducing permeability of the formation, or to consolidate the formation itself.

SUMMARY OF THE INVENTION

According to a first aspect of the present invention there is provided a method for consolidating a proppant in a formation, the method comprising injecting in the formation a composition comprising an enzyme and a substrate.

Typically, the reaction of the enzyme with the substrate results in precipitation of a material which may consolidate the proppant in the formation.

The method may comprise consolidating the proppant in a fractured formation, e.g. in one or more fractures formed therein.

The method may comprise consolidating the proppant in situ. The method may comprise reacting the enzyme with the substrate in situ.

The inventors have surprisingly discovered that it is possible to consolidate proppants in situ using a composition comprising an enzyme and a substrate, without significantly adversely affecting the rate of production of hydrocarbons in the formation. Typically, the reduction in permeability of the formation may be less than or equal to approximately 95%, e.g. less than or equal to approximately 90%, e.g. less than or equal to approximately 75%, e.g. less than or equal to approximately 50%, e.g. less than or equal to approximately 40%, e.g. less than or equal to approximately 30%, e.g. less than or equal to approximately 20%.

The method may comprise fracturing the formation. The method may comprise injecting a fracturing fluid in the formation.

The method may comprise injecting a proppant, e.g. proppant particles, in the formation, e.g. in the fractured formation. The method may comprise injecting the proppant during fracturing. The method may comprise injecting the proppant after fracturing.

The method may comprise injecting in the formation the composition comprising an enzyme and a substrate, after fracturing the formation and/or after injecting a proppant in the formation. By such provision, the proppant, e.g. at least some proppant particles, may be consolidated in situ.

The method may comprise consolidating at least some proppant particles.

In one embodiment, the method may comprise consolidating some of the proppant particles. The method may comprise consolidating proppant particles located nearest the wellbore. The method may comprise consolidating proppant particles located in a portion of a fracture nearest the wellbore. In use, when the composition is injected in the formation, the method may comprise contacting proppant particles located in a portion of a fracture nearest the wellbore. By such provision, consolidation of proppant particles in a portion of the fracture farthest from the wellbore may be not be necessary. Consolidation of proppant particles nearest the wellbore may be sufficient to prevent displacement or dislodgement of the proppant particles in the fracture. This may advantageously help reduce the amount of composition required to consolidate proppant particles in a fracture.

In another embodiment, the method may comprise consolidating a majority of proppant particles, e.g. a majority of the proppant particles within a fracture. The method may comprise contacting proppant particles with the composition substantially throughout the fracture.

The proppant may comprise proppant particles, e.g. macroscopic particles, such as grains, beads, balls, spheres, or the like.

The proppant may comprise or may be made from a material such as sand, ceramic, glass, metal(s), metal alloy(s), or the like.

Typically, the proppants may comprise sands or sand particles, ceramic beads such as Carbolite™, and/or glass beads.

The proppant may comprise a coating, e.g. a resin coating. In one embodiment the proppant may comprise resin-coated particles, such as resin-coated sand particles.

In another embodiment the proppant may comprise resin-coated ceramic beads such as resin-coated Carbolite™. The coating may comprise a thermosensitive polymer, e.g. a heat curable resin. In one embodiment, the coating may comprise a melamine-formadehyde resin.

The proppant particles may have a dimension, e.g. diameter, in the range of approximately 100-2000 μm, typically 300-1700 μm. The proppant particles may have a size corresponding to a 10-40 mesh.

The enzyme may comprise a urease and/or a source thereof.

The enzyme may typically be water soluble. The composition may be in the form of a solution or a dispersion.

The enzyme may be thermophilic or thermostable.

The enzyme may be obtainable from any plant, animal, bacterial or fungal source. The enzyme may comprise a meal of a plant, e.g. a meal of a plant of the family Leguminosae (Fabaceae), such as Jack bean meal and/or soya bean meal. Preferably, the enzyme may comprise an enzyme obtainable from Jack bean, e.g. Urease Canavalia ensiformis.

The use of Jack bean meal and/or soya bean meal may provide a cost-effective source of urease, for example compared to purified urease. The use of Jack bean meal may provide increased yields of reaction as compared to other forms of urease and/or source thereof, such as Jack bean extracts. Without wishing to be bound by theory, it is believed that Jack bean meal may exhibit improved enzyme activity and/or stability, as compared to other forms of urease and/or source thereof, such as Jack bean extract.

The method may comprise mixing the enzyme with the substrate before injection.

The method may comprise mixing the enzyme with the substrate during injection, or immediately before injection, no more than 1 hours, e.g. no more than 30 minutes, e.g, no more than 10 minutes, before injection. By such provision, premature precipitation of the consolidating material may be avoided.

The method may comprise milling and/or grinding beans, e.g. Jack beans, before mixing and/or before injecting the composition. The method may comprise milling and/or grinding beans, e.g. Jack beans, no more than 6 months, e.g. no more than 3 months, e.g. no more than 1 month, typically no more than 1 week, before mixing and/or before injecting the composition. By such provision, the Jack bean meal may exhibit improved activity and/or stability, and/or the method may provide improved efficiency and/or yield.

The activity of the enzyme may be above 1 unit/L of the composition, typically, in the range of about 1 to about 1,000,000 units, e.g. from about 500 to about 600,000 units, e.g., from about 1000 to about 300,000 units, e.g. from about 2000 to about 100,000 units, e.g. from about 5000 to about 40,000 units, per L of the composition. The composition may comprise an amount or concentration of the enzyme in the range of 10-30 g/L, e.g., 10-25 g/L.

The substrate may comprise urea.

Typically, the reaction of the enzyme with the urea as a substrate may comprise a reaction according to scheme (1):

$$NH_2-C(O)-NH_2 + 2H_2O \rightarrow 2NH_4^+(aq) + CO_3^{2-}(aq) \qquad (1)$$

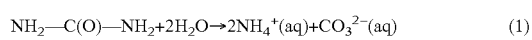

The composition may comprise an amount or concentration of the substrate in the range of 1-1000 g/L, e.g. 50-250 g/L, typically 50-150 g/L.

The composition may further comprise at least one precipitating compound.

The at least one precipitating compound may comprise one or more metal salts.

The at least one precipitating compound may comprise one or more salts of one or more metals selected from the list consisting of aluminium, barium, cadmium, calcium, chromium, cobalt, copper, iron, lead, magnesium, manganese, mercury, nickel, strontium, silver, tin, and/or zinc.

The at least one precipitating compound may form a carbonate precipitate upon reaction with the aqueous carbonate produced by the reaction between the enzyme and the urea substrate.

The at least one precipitating compound may comprise at least one salt of calcium, e.g. calcium nitrate and/or calcium chloride.

Advantageously, the at least one precipitating compound may comprise calcium chloride. The inventors have surprisingly discovered that the use of calcium chloride as a precipitating compound provides superior yields and larger particle sizes of calcium carbonate over alternative precipitating compounds such as calcium nitrate.

Typically, the reaction, e.g. precipitation, of the carbonate produced by the reaction between the enzyme and the urea as a substrate, with the metal salt, e.g. calcium, may comprise a reaction according to scheme (2):

$$Ca^{2+}(aq) + CO_3^{2-}(aq) \rightarrow CaCO_3(s) \qquad (2)$$

The composition may comprise an amount or concentration of the precipitating compound in the range of 100-300 g/L, e.g. 100-250 g/L.

The method may comprise reacting the composition to form a solid precipitate, e.g. a calcium carbonate precipitate. The solid precipitate may act to bind the proppant, e.g. at least some proppant particles, together. The solid precipitate may form a precipitate structure and/or network on the surface of proppant particles. The solid precipitate may comprise solid particles or clusters, e.g. solid calcium carbonate particles or clusters.

When the precipitate comprises solid particles, the precipitated particles, e.g. calcium carbonate particles, may have a dimension, e.g. diameter, in the range of approximately 20-200 μm, typically 50-200 μm, e.g. 50-100 μm.

The composition may further comprise at least one aggregation promoter. The addition of at least one aggregation promoter may increase the rate, yield, and/or amount of precipitation of carbonate, e.g, calcium carbonate.

The at least one aggregation promoter may act as a nucleation initiator, promoting precipitation and/or increasing yield of precipitation. The at least one aggregation promoter may act to increase the size of the precipitated particles, precipitate structure and/or network, e.g. on the surface of proppant particles, as compared to a similar precipitates formed in the absence of any aggregation promoter. This may increase the strength of the consolidation structure and/or precipitate structure formed through reaction of the enzyme with the substrate.

The at least one aggregation promoter may comprise a silicate compound such as a clay compound. Typically, the at least one aggregation promoter may comprise a bentonite compound, e.g. bentonite and/or cationic bentonite.

The at least one aggregation promoter may be provided in the form of particulates and/or particles, e.g. microparticles.

The composition may comprise an amount or concentration of the aggregation promoter compound in the range of 1-100 g/L, e.g. 10-50 g/L, typically 10-25 g/L.

The composition may further comprise at least one reinforcing material.

The at least one reinforcing material may comprise at least one fibrous material.

The at least one reinforcing material may comprise a polymeric fibrous material such as cellulosic fibrous material, e.g. cellulose fibres; an inorganic fibrous material, e.g. glass fibres; or the like.

Typically, the at least one reinforcing material may comprise glass fibre. Glass fibre may exhibit high compatibility and/or adhesion with the precipitated compound, e.g. calcium carbonate.

Without wishing to be bound by theory, the at least one reinforcing material may provide a structural support and/or network for the precipitate. Thus, provision of at least one reinforcing material may increase the strength and/or flexibility of the consolidation structure and/or precipitate structure formed through reaction of the enzyme with the substrate, as compared to a similar consolidation structure and/or precipitate structure formed in the absence of any reinforcing material. This may further reduce or prevent flow of proppant into the wellbore during production of the formation, while maintaining adequate flow of hydrocarbons during production.

The composition may comprise an amount or concentration of the at least one reinforcing material in the range of 1-10 g/L. e.g., 1-5 g/L, typically 2-3 g/L.

In one embodiment, the method may comprise injecting in the formation a composition comprising at least one aggregation promoter and at least one reinforcing material. The combination of at least one aggregation promoter and at least one reinforcing material may increase the strength, flexibility and size of the consolidation structure and/or precipitate structure formed through reaction of the enzyme with the substrate, which may provide a particularly effective method of consolidation.

In one embodiment, the method may comprise injecting in the formation a composition comprising an enzyme obtainable from Jack bean meal, urea, calcium chloride, and optionally at least one reinforcing material such as glass fibre, and/or at least one aggregation promoter such as bentonite, e.g. cationic bentonite.

The method may comprise injecting the composition at a temperature in the range of about 20° C. to about 100° C., typically between 20° C. and 80° C., under formation conditions.

The method may comprise adjusting the pH of the composition, e.g. in the range of about 7 to 9, e.g., 7.5 to 8.5, typically about 8. In such instance, the composition may comprise a pH adjuster. Such pH control may help optimise reaction between the enzyme and the substrate and/or may increase reaction yield.

According to a second aspect of the present invention there is provided a method for fracturing a formation comprising:

injecting a proppant in the formation; and injecting in the formation a composition comprising an enzyme and a substrate to consolidate the proppant in situ.

The method may further comprise fracturing the formation. The method may comprise injecting a fracturing fluid in the formation. The method may comprise fracturing the formation before injecting the composition comprising an enzyme and a substrate.

The method may comprise injecting the proppant during fracturing. The method may comprise injecting the proppant after fracturing.

The features described above in relation to the method according to a first aspect or the invention, can apply in respect of the method according to a second aspect of the present invention, and are therefore not repeated here for brevity.

According to a third aspect of the present invention there is provided a composition for consolidating a proppant, the composition comprising an enzyme and a substrate.

The enzyme may comprise a urease and/or a source thereof.

The enzyme may typically be water soluble. The composition may be in the form of a solution or a dispersion.

The enzyme may be thermophilic or the mosable.

The enzyme may be obtainable from any plant, animal, bacterial or fungal source. The enzyme may comprise a meal of a plant, e.g. a meal of a plant of the family Leguminosae (Fabaceae), such as Jack bean meal and/or soy bean meal. Preferably, the enzyme may comprise en enzyme obtainable from Jack bean, e.g. Urease Canavalia ensiformis.

The use of Jack bean meal and/or soy bean meal may provide a cost-effective source of urease, for example compared to purified urease. The use of Jack bean meal may provide increased yields of reaction as compared to other forms of urease and/or source thereof, such as Jack bean extracts. Without wishing to be bound by theory, it is believed that Jack bean meal may exhibit improved enzyme activity and/or stability, as compared to other forms of urease and/or source thereof, such as Jack bean extract. Storage of Jack bean extract is considered to be difficult and Jack bean extract is prone to losing its enzyme activity over time, whereas storage of Jack bean is comparatively easy and no or minimum reduction in its enzyme activity is observed when Jack bean is stored as bean instead of extract.

The composition may be obtainable by mixing the enzyme with the substrate before injection.

The composition may be obtainable by milling and/or grinding beans, e.g. Jack beans, before mixing and/or before injecting the composition. The composition may be obtainable by milling and/or grinding beans, e.g. Jack beans, no more than 6 months, e.g. no more than 3 months, ag, no more than 1 month, typically no more than 1 week, before mixing and/or before injecting the composition. By such provision, the Jack bean meal may exhibit improved activity and/or stability, and/or the method may provide improved efficiency and/or yield.

The activity of the enzyme may be above 1 unit/L of the composition, typically, in the range of about 1 to about 1,000,000 units, e.g. from about 500 to about 600,000 units, e.g. from about 1000 to about 300,000 units, e.g. from about 2000 to about 100,000 units, e.g. from about 5000 to about 40,000 units, per L of the composition.

The composition may comprise an amount or concentration of the enzyme in the range of 10-30 g/L, e.g. 10-25 g/L.

The substrate may comprise urea.

Typically, the reaction of the enzyme with the urea as a substrate may comprise a reaction according to scheme (1):

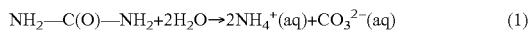

$$NH_2-C(O)-NH_2 + 2H_2O \rightarrow 2NH_4^+(aq) + CO_3^{2-}(aq) \quad (1)$$

The composition may comprise an amount of the substrate in the range of 1-1000 g/L, e.g. 50-250 g/L, typically 50-150 g/L.

The composition may further comprise at least one precipitating compound.

The at least one precipitating compound may comprise one or more metal salts.

The at least one precipitating compound may comprise one or more salts of one or more metals selected from the list consisting of aluminium, barium, cadmium, calcium, chromium, cobalt, copper, iron, lead, magnesium, manganese, mercury, nickel, strontium, silver, tin, and/or zinc.

The at least one precipitating compound may form a carbonate precipitate upon reaction with the aqueous carbonate produced by the reaction between the enzyme and the urea substrate.

The at least one precipitating compound may comprise at least one salt of calcium, e.g. calcium nitrate and/or calcium chloride. Advantageously, the at least one precipitating compound may comprise calcium chloride.

The inventors have surprisingly discovered that the use of calcium chloride as a precipitating compound provides superior yields and larger particle sizes of calcium carbonate over alternative precipitating compounds such as calcium nitrate. Typically, the reaction, e.g. precipitation, of the carbonate produced by the reaction between enzyme and the urea as a substrate; with the metal salt; e.g. calcium, may comprise a reaction according to scheme (2):

$$Ca^{2+}(aq) + CO_3^{2-}(aq) \rightarrow CaCO_3(s) \quad (2)$$

The composition may comprise an amount of the precipitating compound in the range of 100-300 g/L, e.g. 100-250 g/L.

The composition may react to form a solid precipitate, e.g. a calcium carbonate precipitate. The solid precipitate may act to bind the proppant, e.g, proppant particles, together. The solid precipitate may form a precipitate structure and/or network on the surface of proppant particles. The solid precipitate may comprise solid particles, e.g. solid calcium carbonate particles.

When the precipitate comprises solid particles, the precipitated particles, e.g. calcium carbonate particles, may have a dimension, e.g. diameter, in the range of approximately 20-200 μm, typically 50-200 μm, e.g. 50-100 μm.

The composition may further comprise at least one aggregation promoter. The addition of at least one aggregation promoter may increase the rate, yield, and/or amount of precipitation of carbonate, e.g. calcium carbonate.

The at least one aggregation promoter may act as a nucleation initiator, promoting precipitation and/or increasing yield of precipitation. The at least one aggregation promoter may act to increase the size of the precipitated particles, precipitate structure and/or network, e.g. on the surface of proppant particles, as compared to a similar precipitates formed in the absence of any aggregation promoter. This may increase the strength of the consolidation structure and/or network formed through reaction of the enzyme with the substrate.

The at least one aggregation promoter may comprise a silicate compound such as a clay compound. Typically, the at least one aggregation promoter may comprise a bentonite compound, e.g. bentonite and/or cationic bentonite.

The at least one aggregation promoter may be provided in the form of particulates and/or particles, e.g. microparticles.

The composition may comprise an amount of the aggregation promoter compound in the range of 1-100 g/L, e.g. 10-50 g/L, typically 10-25 g/L.

The composition may further comprise at least one reinforcing material.

The at least one reinforcing material may comprise at least one fibrous material.

The at least one reinforcing material may comprise a polymeric fibrous material such as cellulosic fibrous material, e.g. cellulose fibres: an inorganic fibrous material, e.g, glass fibres; or the like.

Typically, the at least one reinforcing material may comprise glass fibre. Glass fibre may exhibit high compatibility and/or adhesion with the precipitated compound, e.g. calcium carbonate.

Without wishing to be bound by theory, the at least one reinforcing material may provide a structural support and/or network for the precipitate. Thus, provision of at least one reinforcing material may increase the strength and/or flexibility of the consolidation structure and/or precipitate structure formed through reaction of the enzyme with the substrate, as compared to a similar consolidation structure and/or precipitate structure formed in the absence of any reinforcing material. This may further reduce or prevent flow of proppant into the wellbore during production of the formation, while maintaining adequate flow of hydrocarbons during production.

The composition may comprise an amount of the at least one reinforcing material in the range of 1-10 g/L, e.g. 1-5 g/L, typically 2-3 g/L.

In one embodiment, the composition may comprise at least one aggregation promoter and at least one reinforcing material. The combination of at least one aggregation promoter and at least one reinforcing material may increase the strength, flexibility and size of the consolidation structure and/or precipitate structure formed through reaction of the enzyme with the substrate, which may provide a particularly effective method of consolidation.

In one embodiment, the composition may comprise an enzyme obtainable from Jack bean meal, urea, calcium chloride, and optionally at least one reinforcing material such as glass fibre, and/or at least one aggregation promoter such as bentonite.

The features described above in relation to the method according to a first aspect or a second aspect or the invention, can apply in respect of the composition according to a third aspect of the present invention, and are therefore not repeated here for brevity.

According to a fourth aspect of the present invention there is provided the use of a composition for consolidating a proppant, the composition comprising an enzyme and a substrate.

The use may comprise consolidating the proppant in a formation. The use may comprise consolidating the proppant in situ. The use may comprise reacting the enzyme with the substrate in situ.

The features described above in relation to the method according to a first or second aspect or the invention or the composition according to a third aspect, can apply in respect of the use according to a fourth aspect of the present invention, and are therefore not repeated here for brevity.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

FIGS. 1A to 1E are sequential schematic views of a process according to an embodiment of the present invention.

Figure 1A:
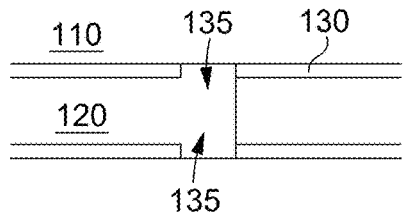
FIGS. 1A to 1E show sequential schematic views of a process according to an embodiment of the present invention.

The process comprises providing a wellbore 120 in a formation 110, as shown in FIG. 1A. In this embodiment, the wellbore 120 is substantially horizontal; but in other embodiments the wellbore 120 may be substantially vertical, or may be drilled at any other angle; depending on the specific requirements dictated by, for example, the formation to be produced. A casing 130 is typically provided in the wellbore 120. The casing 130 typically has a number of openings 135 along its length. Such openings may be provided by perforating the casing 130, for example using a perforating gun.

While FIG. 1A shows a cased wellbore 120, in other embodiments, the wellbore 120 may be uncased.

Figure 1B:
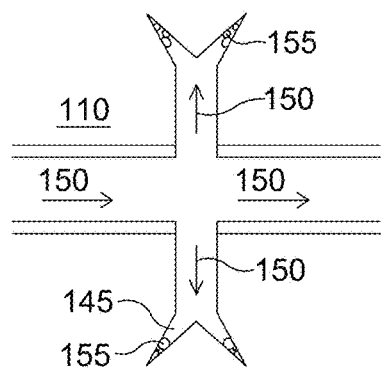

FIG. 1B shows a step of fracturing the formation 110. The process comprises injecting a fracturing fluid into the wellbore in the direction of arrows 150. The pressure of the fracturing fluid creates fractures or fissures 145 from openings 135 in the casing 130 into the formation 110. Fractures 145 act as channels which facilitate and increase production of hydrocarbons, e.g. oil, from the formation 110 into the wellbore 120 during subsequent production.

In this embodiment the fracturing fluid also comprises a proppant. Therefore, in this embodiment, the fracturing step comprises injecting a proppant in the formation 110. Injection of a proppant assists to reduce or prevent closure or collapse of fractures 145 when the hydraulic fracture pressure is released. In this embodiment the proppant comprises proppant particles 155. The process comprises injecting a proppant into the wellbore 120 in the direction of arrows 150. The proppant particles 155 flow into the fractures 145 and "prop" the fractures 145 open.

While only a portion of the fracture 145 is shown in FIGS. 1B to 1E as being filled with proppant particles 155, it will be appreciated that, in another embodiment, most of, or substantially all of, the fracture 145 may be filled with proppant particles 155.

In this embodiment the injection of a proppant is shown simultaneous to the fracturing step. However, it will be appreciated that, in other embodiments, the step of injecting a proppant may be carried out subsequent to the fracturing step.

In this embodiment, the proppant particles 155 comprise sand particles, e.g. sand grains, which may optionally be coated by a resin. In other embodiments, the proppant particles 155 may comprise glass beads, ceramic beads, or the like.

Figure 1D:
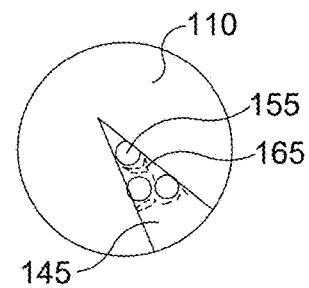
Figure 1C:
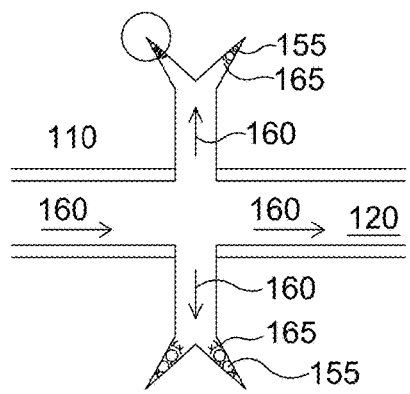

In order to avoid displacement and producing of proppant particles 155 during subsequent production of the formation 120, the process comprises consolidating the proppant particles 155 in the fractures 145 in the formation 120 in situ, as shown in FIG. 1C. The method comprises injecting a composition into the wellbore 120 in the direction of arrows 160.

An enlarged schematic view of proppant particles 155 consolidated by consolidating structure 165 according to an embodiment of the present invention is shown in FIG. 1D. In this embodiment, the composition contacts proppant particles 155 substantially throughout the fractures 145. However, it will be appreciated that in other embodiments the composition may contact only the proppant particles 155 located in a portion of a fracture nearest the wellbore 120, for example similar to the embodiment depicted in FIG. 2B.

The composition comprises an enzyme and a substrate. The inventors have surprisingly discovered that it is possible to consolidate proppant particles 155 in situ using a composition comprising an enzyme and a substrate, without significantly adversely affecting the permeability of the formation, and thus the rate of production of hydrocarbons in the formation 110. In this embodiment, the composition comprises Jack bean meal as the enzyme, and urea as the substrate.

In this embodiment, the composition also comprises calcium chloride as a precipitating compound. Calcium chloride provides a source of soluble calcium which precipitates with the carbonate ions produced during the reaction between urea and the enzyme. Calcium carbonate thus forms a precipitate structure or aggregates 165 on the surface of the proppant particles 155, which assists in consolidating the proppant particles 155 in situ and avoid displacement or dislodgement of the proppant particles 155 during subsequent production of the formation 110.

In this embodiment, the composition further comprises bentonite as an aggregation promoter. The inventors have discovered that Bentonite acts as a nucleation initiator, promoting precipitation and/or increasing yield of precipitation of calcium carbonate.

In this embodiment, the composition further comprises a fibrous material, e.g. glass fibre, as a reinforcing material. Without wishing to be bound by theory, the reinforcing material may provide a structural support and/or network for the precipitate. Thus, it has been discovered that the provision of a reinforcing material may increase the strength and/or flexibility of the calcium carbonate precipitate structure 165 formed through reaction of the enzyme with the urea substrate, as compared to a similar precipitate structure formed in the absence of any reinforcing material. This may further reduce or prevent flow of proppant particles 155 into the wellbore 120 during production of the formation 110.

Figure 1E:
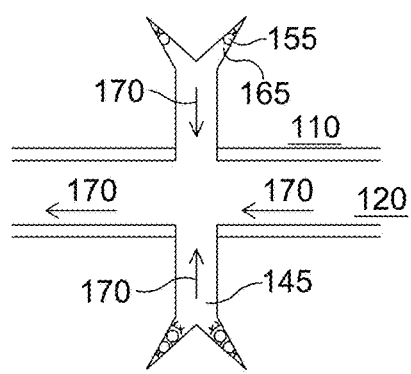

FIG. 1E shows a step of producing the formation 110. The method comprises producing hydrocarbons from the formation 110 into the wellbore 120 in the direction of arrows 170. Advantageously, the proppant particles 155, which have been consolidated in situ in the fractures 145, are not displaced or dislodged during production of the formation 110.

Figure 2A:
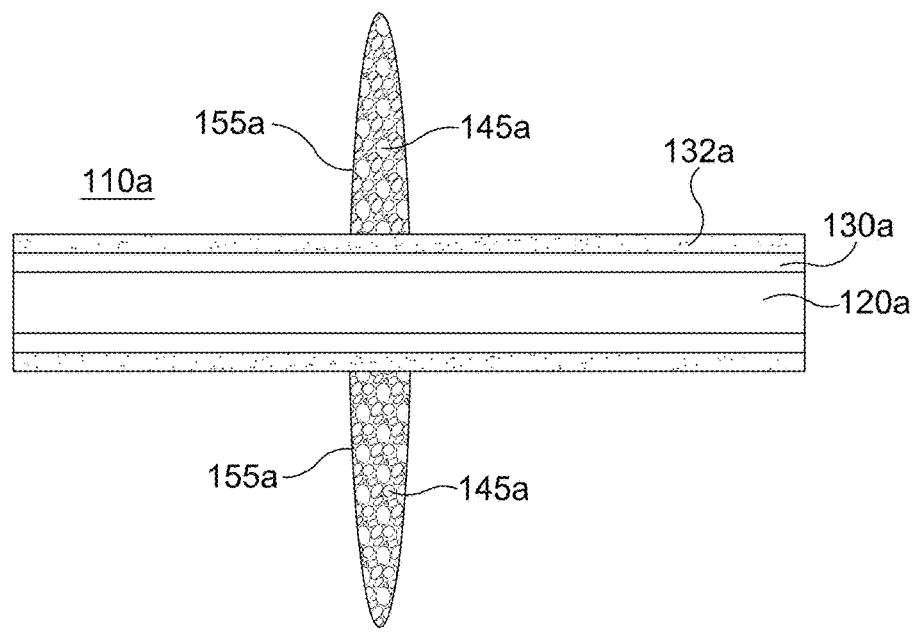
FIGS. 2A and 2B show schematic views of an alternative embodiment of the process of FIGS. 1A to 1E.
Figure 2B:
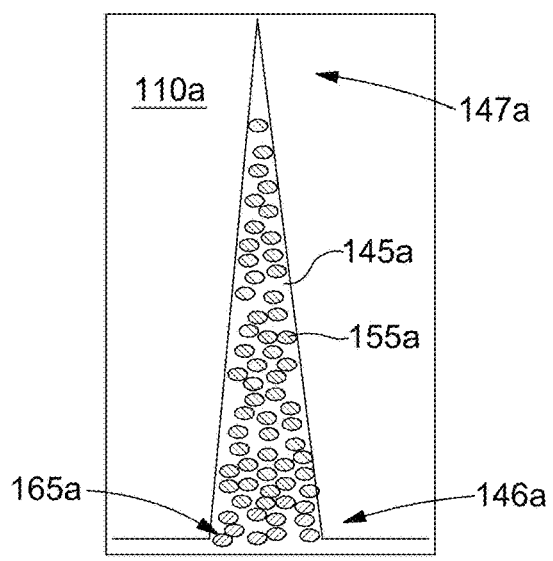

FIGS. 2A and 2B show schematic views of an alternative embodiment of the process of FIGS. 1A to 1E. The process depicted in FIGS. 2A and 2B is generally similar to the process depicted with reference to FIGS. 1A to 1E, like part being denoted by like numerals, supplemented by the suffix "a".

The wellbore 120a of FIG. 2A is substantially horizontal, but in other embodiments the wellbore 120a may be substantially vertical, or may be drilled at any other angle, depending on the specific requirements dictated by, for example, the formation to be produced. A casing 130a is typically provided in the wellbore 120a. The casing 130a is cemented in place by a cemented portion 132a. The casing 130a typically has a number of openings (not shown) along its length, which may be provided by perforating the casing 130a, for example using a perforating gun.

As in FIGS. 1A to 1E, the process of FIGS. 2A and 2B comprises providing a wellbore 120a in a formation 110a, fracturing the formation 110a, injecting proppant particles 155a in the formation 110a (FIG. 2A), consolidating the proppant particles 155a in the fractures 145a in the formation 120a in situ (FIG. 2B), and producing the formation 110a.

In this embodiment, as shown in FIG. 2B depicting an enlarged schematic view of proppant particles 155a consolidated by consolidating structure 165a, the composition contacts proppant particles 155a located in a portion 146a of the fracture 145a nearest the wellbore 120a. By such provision, consolidation of proppant particles 155a in a portion 147a of the fracture 145a farthest from the wellbore 120a is not necessary to prevent displacement or dislodgement of the proppant particles 155a during subsequent production of the formation 110a.

Experimental

Materials

The following materials were used during investigation of the consolidating composition according to the present invention.

Urea substrate: 100 g/L urea (Fluke Chemie AG);

Enzyme: 25 g/L Jack bean meal (VWR International and Spectrum Chemical Mfg Corp);

Precipitating compound: 250 g/L $CaCl_2$, $2H_2O$ (Sigma-Aldrich Chemie);

Aggregation Promoter: cationic bentonite (Flygtol, Kemira AB);

Reinforcing material: glass fibres (Fibertec types 3032, 3082W, 6608 and 7242, Fibertec Inc.; Johns Manville types 90, 108A and 206, Johns Manville).

Methods

Consolidation compositions were prepared using the above ingredients, and the resulting aggregates were observed.

Batch precipitation was carried out in containers placed in a 60° C. water bath for 20 hours.

The size distribution of the aggregates was measured by laser diffraction using a Malvern Mastersizer X (long bench) equipped with a 1000 mm lens. Large aggregates (>1 mm) were quantified by screening on a 1 mm sieve, and subsequently drying and weighing the aggregates.

Experiments and Results

1) Enzyme

The effect of the freshness of the enzyme on the precipitation yield and size of calcium carbonate aggregates was investigated. The results are shown in FIG. 3, in dry weight of $CaCO_3$ aggregates per liter total solution, using two different types of glass fiber reinforcing materials.

Figure 3:
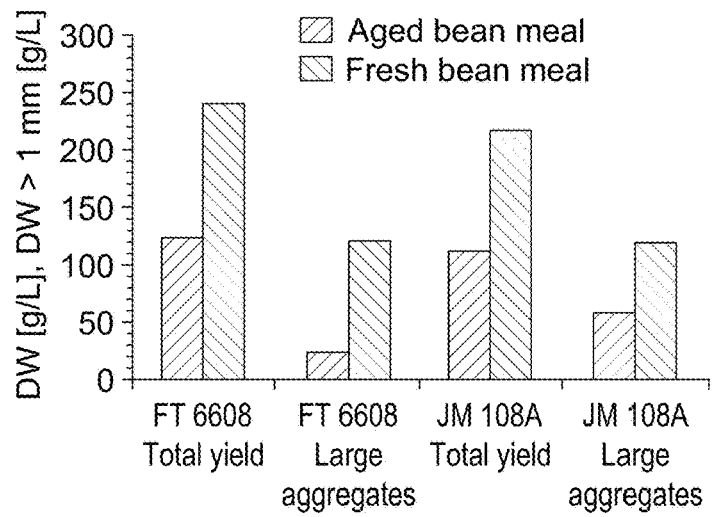
FIG. 3 is a graph showing the effect of freshness of the enzyme on the precipitation yield and size of calcium carbonate aggregates.

FIG. 3 shows that the use of fresh Jack bean meal leads to better yields and larger aggregates than the use of bean meal extracts.

2) Precipitating Compound

The effect of the type of precipitating compound on the precipitation yield and size of calcium carbonate aggregates was investigated. The results are shown in FIG. 4, in dry weight of $CaCO_3$ aggregates per liter of total solution.

Figure 4:
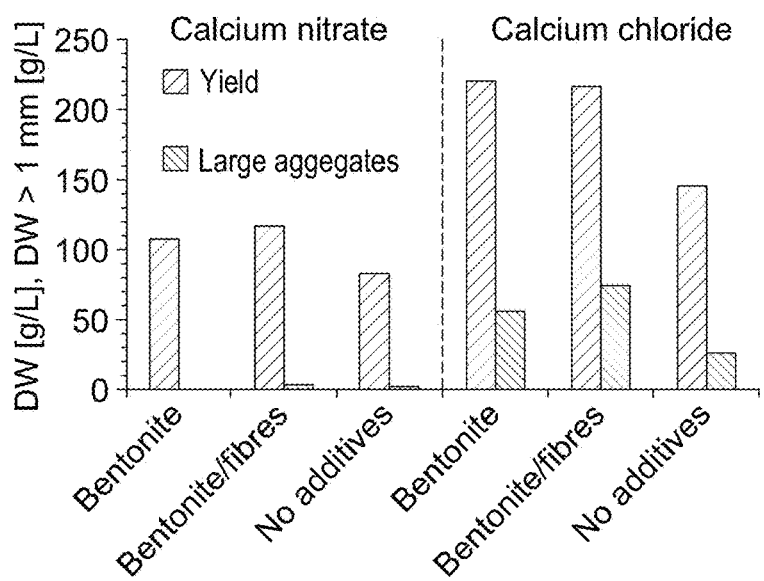
FIG. 4 is a graph showing the effect of type of precipitating compound on the precipitation yield and size of calcium carbonate aggregates, and also showing the effect of bentonite and reinforcing fibres on the precipitation yield and size of calcium carbonate aggregates.

FIG. 4 shows that the use of $CaCl_2$ as precipitating compound surprisingly leads to better yields and larger aggregates of calcium carbonate than the use of $CaNO_3$, both in the presence or absence of further additives.

3) Time

The precipitation yield of calcium carbonate aggregates was measured as a function of time. The results are shown in FIG. 5, in dry weight of $CaCO_3$ aggregates per liter of total solution.

Figure 5:
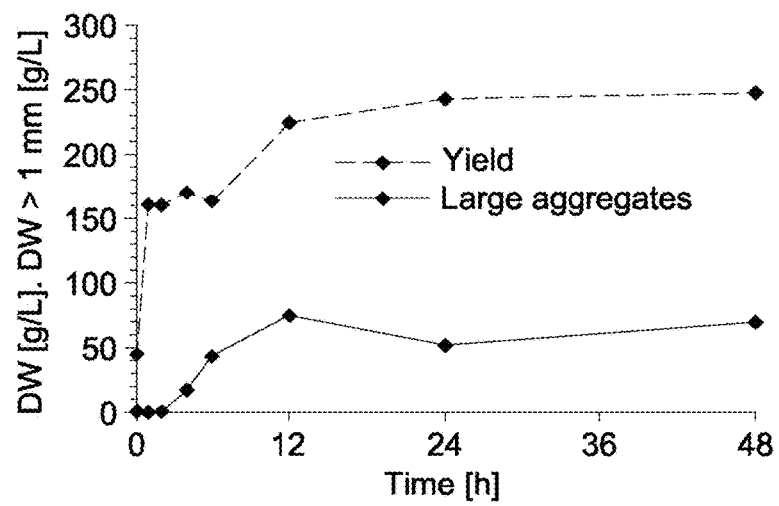
FIG. 5 is a graph showing the precipitation yield of calcium carbonate aggregates as a function of time.

FIG. 5 shows that approximately 75% of the total yield occurs within the first hour of precipitation. Further, it can be observed that reaction is virtually complete within 12 hours. This confirms that the composition of the present invention is suitable for use in situ, as high yields are achieved in a relatively short period of time.

4) Compatibility with Proppant Particles

The compatibility of the consolidating composition with sand proppant particles was investigated. The results are shown in FIG. 6, which shows SEM images of sand particles consolidated with a composition based on urea, Jack bean meal, and $CaCl_2$, at 60° C., after 1, 2, 3 and 4 injections.

Figure 6:
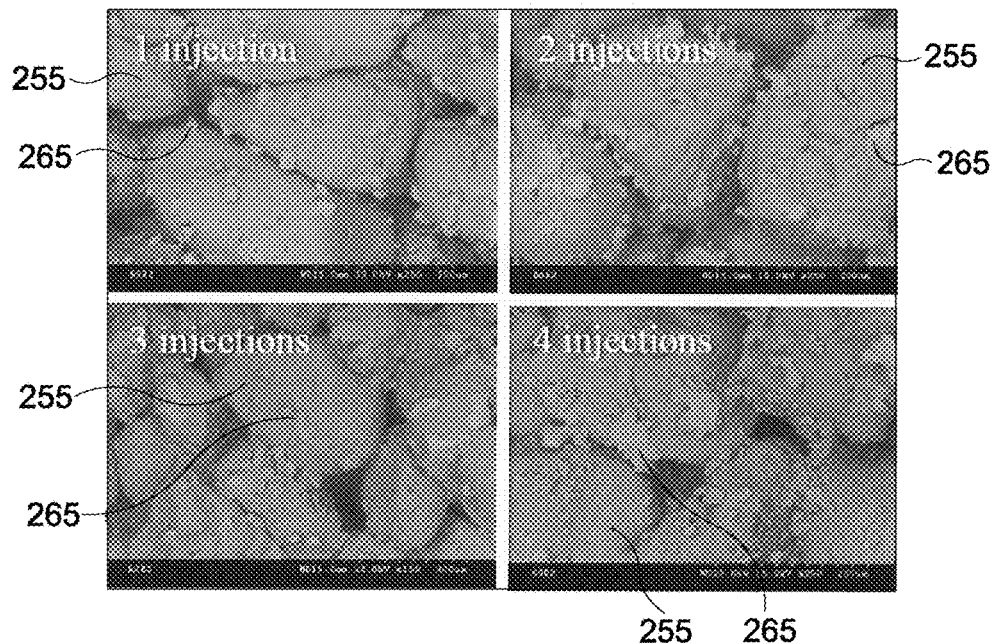
FIG. 6 shows SEM images of sand particles consolidated with a composition according to an embodiment of the present invention, after 1; 2, 3 and 4 injections.

FIG. 6 confirms the excellent adhesion of $CaCO_3$ aggregates 255 on sand particles 265.

5) Aggregation Promoter

Figure 7:
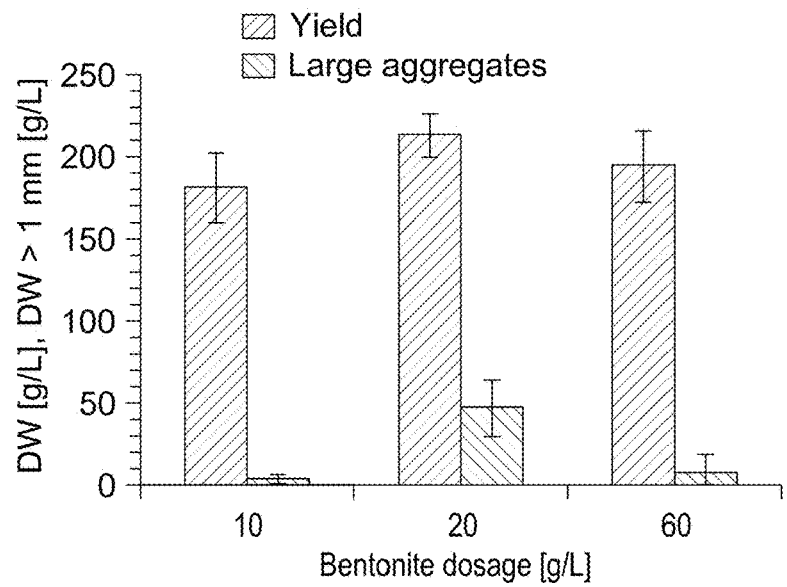
FIG. 7 is a graph showing the effect of the amount of aggregation promoter in the composition on the precipitation yield and size of calcium carbonate aggregates.

The effect of an aggregation promoter on the precipitation yield and size of calcium carbonate aggregates was investigated. The results are shown in FIG. 4 and FIG. 7, in dry weight of $CaCO_3$ aggregates per liter of total solution. FIG. 4 shows that the use of bentonite in the composition surprisingly leads to better yields and much larger aggregates of calcium carbonate as compared to the same composition free of bentonite. This effect is particularly noticeable when $CaCl_2$ is used as precipitating compound.

Various compositions of bentonite were tested, and the results are shown in FIG. 7. FIG. 7 shows that a dosage of approximately 20 g/L appears to provide better results than a lower dosage of 10 g/L or a much higher dosage of 60 g/L. Therefore, an optimum amount of bentonite in the composition may be between 10 and 60 g/L, particularly in the region of about 20 g/L.

6) Reinforcing Material

The effect of a reinforcing material on the precipitation yield and size of calcium carbonate aggregates was investigated. The results are shown in FIG. 4, in dry weight of $CaCO_3$ aggregates per liter of total solution.

FIG. 4 shows that the use of glass fibre in the composition leads to better yields and larger aggregates of calcium carbonate as compared to the same composition free of glass fibre. This effect is particularly noticeable when $CaCl_2$ is used as precipitating compound. The use of glass fibre therefore appears to enhance the aggregation effect of bentonite. Without wishing to be bound by theory, the provision of glass fibres as a reinforcing material may provide a structural support and/or network for the calcium carbonate precipitate. Thus, provision of glass fibres may increase the strength and/or flexibility of the precipitate structure formed through reaction of the enzyme with the urea substrate, as compared to a similar precipitate structure formed in the absence of any glass fibres. This may further reduce or prevent flow of proppant into the wellbore during production of the formation.

Figure 8:
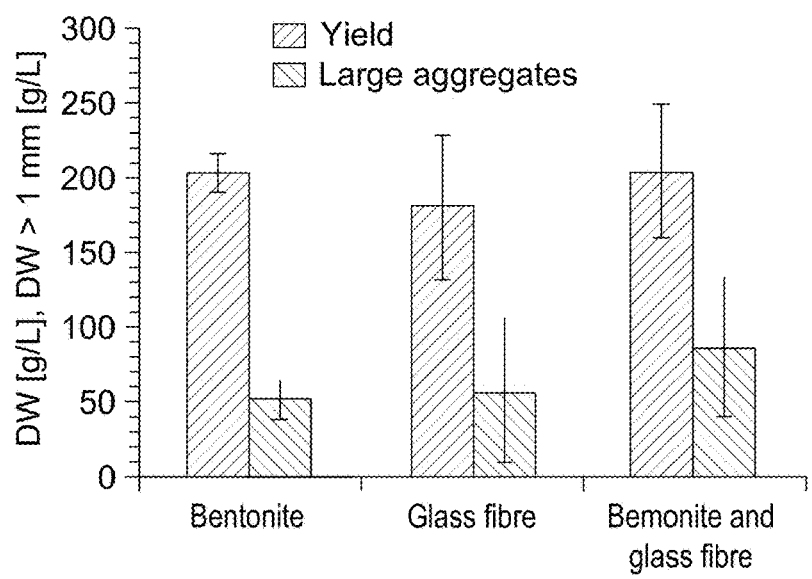
FIG. 8 shows the effect of combining bentonite as an aggregation promoter and glass fibres as a reinforcing material on the precipitation yield and size of calcium carbonate aggregates.

This effect is also confirmed by the results shown in FIG. 8, which shows the effect of combining bentonite and glass fibres as compared to using each individually. It can be seen that the addition of glass fibres in the composition leads to better yields and much larger aggregates of calcium carbonate as compared to the same composition free of glass fibres.

Core Flood Experiments

The purpose of the core flood experiments was to investigate the efficacy of the method according to the present invention under various conditions which mimic the temperature and pressure of the reservoir, and for a number of different proppant materials. The coreflood experiments aimed to quantify permeability changes upon calcium carbonate precipitation as well as determine the extent of proppant production via back production tests.

Materials

The following materials were used during the coreflood experiments. Proppant: Sand proppant: natural Polish sand,
Ceramic proppant 1: Carbolite™ 20/40 mesh size,
Ceramic proppant 2: resin-coated Garbolite™ 20/40 mesh size;
Urea substrate: urea ($CH_4N_2O$) supplied by Halliburton;
Enzyme: Jack bean meal (beans supplied by Halliburton);
Precipitating compound: $CaCl_2$ supplied by Halliburton;
Solvent: Esbjerg tap water;
Aggregation Promoter: cationic bentonite supplied by Halliburton;

Preparation

Two suspensions were prepared according to the recipe described below in Table 1. The recipe consists entirely of field grade chemicals.

Component 1 was prepared by suspending the compounds in 30 mL of Esbjerg tap water. The suspension was placed on a magnetic stirrer and stirred for 15 minutes in order to disperse the insoluble components and dissolve $CaCl_2$ and urea. The suspension was cooled to 5° C. and poured into a high-pressure cylinder.

Component 2 was prepared from whole Jack beans by removing the bean shells, grinding the beans in a coffee grinder, and suspending the bean meal in Esbjerg tap water. The suspension was stirred using magnetic stirring for 15 minutes before being filtered through a 0.2 mm filter (proppant filter, stainless steel wire mesh). The filtrate was cooled to 5° C. into a high-pressure cylinder.

Both components were prepared immediately prior to the injection in order to avoid possible degradation of urea and urease in the separate cylinders. The two components are kept at 5° C. and mixed immediately before injection into core.

TABLE 1

Proppant consolidation recipe for full strength formulation

| | Compound description | Amount [g] | Concentration when mixed (g/L) | Concentration when mixed (mol/L) |
|---|---|---|---|---|
| Component 1 | Calcium chloride | 10.00 | 294.1 | 2.1 |
| | Urea | 4.40 | 129.4 | 2.15 |
| | Cationic bentonite[1] | 0.80[1] | 23.5[1] | |
| | Esbjerg tap water | 30.00 | | |
| Component 2 | Jack bean meal | 1.00 | 29.4 | |
| | Esbjerg tap water | 4.00 | | |

[1]Cationic bentonite was not included in Experiments 2, 3, 4 and 5.

Set-up

Figure 9:
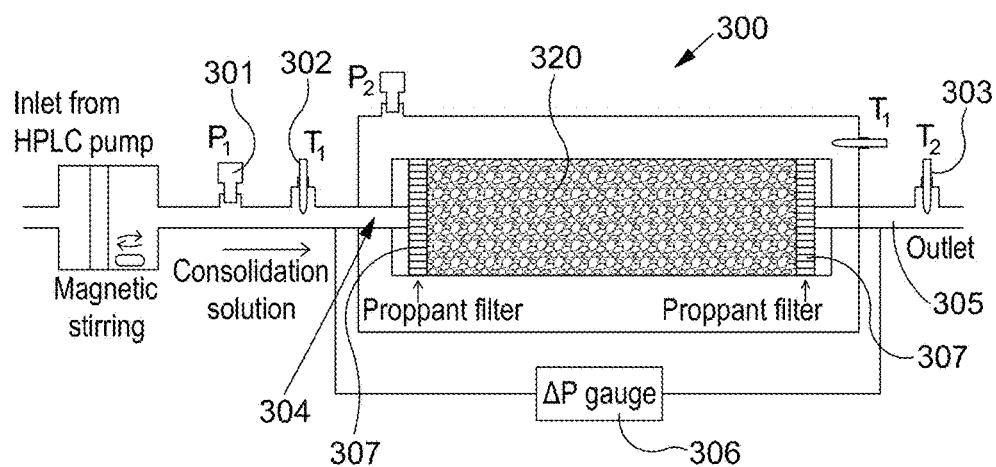
FIG. 9 shows a schematic view of a coreflood apparatus used in experiments 1-5.

The proppant consolidation core flooding experiments were conducted in purpose-built coreflood apparatus 300. The coreflood setup that was used for the experiments is depicted in FIG. 9. Pressure, flows and temperatures were logged via LabView software. The apparatus 300 comprises of an inner column 320 packed with the proppant sample 355.

Component 1 was injected from two high pressure cylinders (at a temperature of about 5° C.) using a HPLC pump 301 at a rate of 10 mL/min. Component 2 was injected from another high pressure cylinder (at a temperature of about 5° C.) using a HPLC pump at a rate of 1.4 mL/min. The two components were mixed about 2.5 mL (for about 14 seconds) prior to entering the proppant pack 320. There are temperature sensors 302,303 positioned about 2 mL (about 5 cm) before entering the proppant pack inlet 304 and 2 mL (5 cm) after leaving the proppant pack outlet 305. A temperature of 55° C. was used in the coreflood setup to simulate near well cooling. A pressure sensor apparatus 306 is provided to measure the pressure differential AP between the inlet 304 and the outlet 305.

Figure 10:
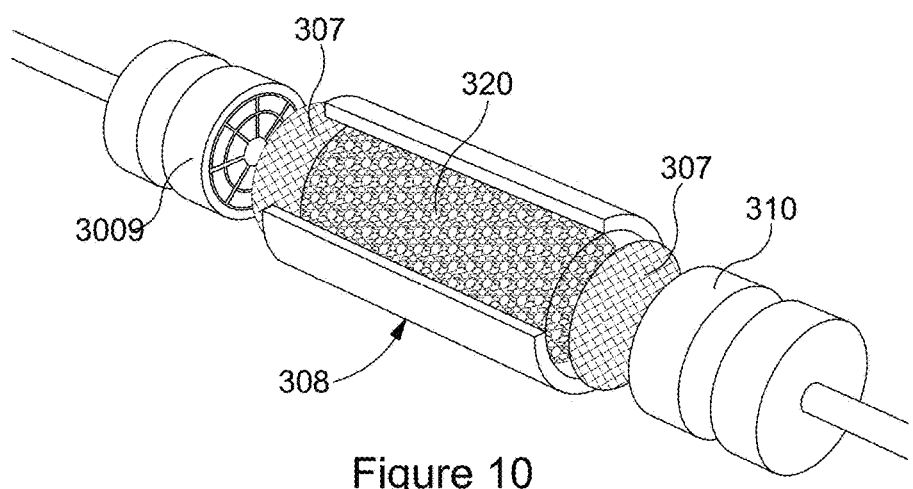
FIG. 10 shows an exploded perspective view of the proppa pack used in the apparatus of FIG. 9.

The set-up of the proppant pack 320 is described in FIG. 10. In each end of the proppant column, proppant filters 307 (with 0.2 mm holes) were used to confine the proppant 320 inside the column throughout the consolidation experiment. The proppant column is mounted in a Viton® sleeve 308 under external pressure to simulate an overburden pressure on the proppant column.

Figure 11:
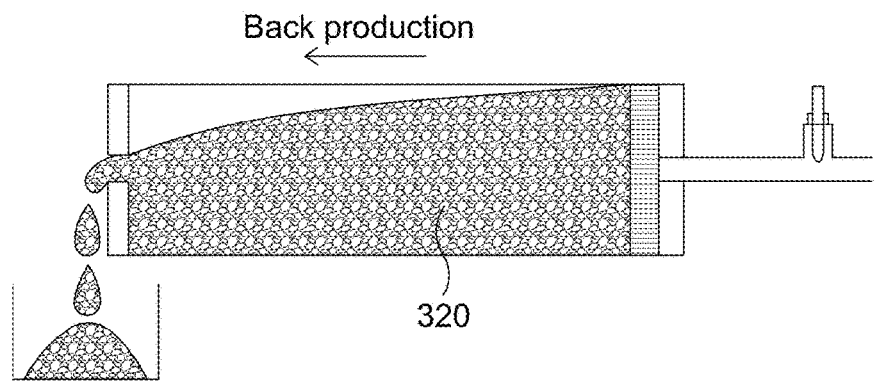
FIG. 11 shows a schematic view of the set-up used for measuring back production of a consolidated proppant pack.

The consolidation of the proppant pack was measured by back producing the proppant column (from formation to wellbore) and measuring the amount of produced proppant at increasing flow rates of tap water (see FIG. 11 and Table 2 below). The flow rate was adjusted to the desired flow before being passed through the proppant pack in a horizontal set-up. In order to simulate the back-flow through 12.7 mm 0 perforations in the producer, the consolidated proppant pack 320 was fitted with a flow restrictor 310 (analogous to the flow disperser 309 in FIG. 10) directing the flow through the centre with an opening diameter of 9.85 mm. This gave a surface area of the bulk proppant pack of 11.4 cm$^2$ and 0.762 cm$^2$ through the flow restrictor 310. The proppant pack was tested at each flow rate (see Table 2) for 10 minutes and the wellbore side was investigated before increasing the flow.

TABLE 2

Flow rates tested and corresponding velocity through the proppant pack and flow restriction.

| # | Flow rate [mL/min] | Velocity through entire proppant pack [mL/min/cm$^2$] | Velocity through flow restriction [mL/min/cm$^2$] |
| --- | --- | --- | --- |
| 1 | 25 | 2.2 | 32.8 |
| 2 | 50 | 4.4 | 65.6 |
| 3 | 75 | 6.6 | 98.4 |
| 4 | 100 | 8.8 | 131.2 |
| 5 | 150 | 13.2 | 196.9 |
| 6 | 200 | 17.5 | 262.5 |
| 7 | 300 | 26.3 | 393.7 |
| 8 | 400 | 35.1 | 524.9 |
| 9 | 500 | 43.9 | 656.2 |
| 10 | 600 | 52.6 | 787.4 |
| 11 | 700 | 61.4 | 918.6 |
| 12 | 800 | 70.2 | 1049.9 |
| 13 | 900 | 78.9 | 1181.1 |
| 14 | 1000 | 87.7 | 1312.3 |
| 15 | 1100 | 96.5 | 1443.6 |
| 16 | 1200 | 105.3 | 1574.8 |
| 17 | 1300 | 114.0 | 1706.0 |
| 18 | 1400 | 122.8 | 1837.3 |
| 19 | 1600 | 140.4 | 2099.7 |
| 20 | 1800 | 157.9 | 2362.2 |
| 21 | 2000 | 175.4 | 2624.7 |
| 22 | 2200 | 193.0 | 2887.1 |
| 23 | 2400 | 210.5 | 3149.6 |
| 24 | 2600 | 228.1 | 3412.1 |
| 25 | 2800 | 245.6 | 3674.5 |

Method

The procedure used to perform the proppant consolidation coreflood experiments can be described by the following steps.

1. The proppant is mixed together with 5 wt % finely ground calcite and washed with toluene (same volume as the proppant). The toluene is decanted off and methanol is added (same volume as the proppant). After stirring, the methanol is decanted off and the proppant mixture is stored at 55° C. overnight.
2. Pour the proppant mixture in a Viton sleeve fitted with proppant filter and flow disperser and mount it in the core holder.
3. Pressurize the core and overburden to 15 bar using tap water.
4. Heat up to 85° C.
5. Increase overburden pressure to 50 bar.
6. Flush with brine (2 PV (Pore Volume)).
7. Flush with laboratory oil (2 PV) and then with brine (2 PV). Measure both permeabilities.
8. Pre-flush seawater (5 PV), then seawater with 15% glycol (5 PV) for hydrate prevention added, then seawater with 15% EGMBE (5 PV)—mutual solvent for wettability alteration (cleaning/wetting).
9. Cool to 55° C. to simulate near wellbore cooling. (seawater with 15% EGMBE remains in the proppant during the cooling (about 2 hours).
10. Esbjerg tap (2 PV) is flushed through the proppant pack immediately prior to treatment.
11. Inject first main treatment (10 PV). Effluent sampling of each PV for calcium analysis.
12. Shut in overnight.
13. Measure brine permeability.
14. Open core, check end piece for consolidation. Take photograph of both ends of core.
15. Close, reheat to 55° C.
16. Inject second main treatment (10 RV). Effluent sampling of each PV for calcium analysis.
17. Shut in overnight.
18. Measure brine permeability.
19. Open core, check end piece for consolidation. Take photograph of both ends of core.
20. Proppant production test.

Results 1) Natural Polish Sand

In order to determine optimum conditions, three experiments on natural Polish sand proppant were carried using the pumping procedure described below in Table 3 below:

TABLE 3

| Flow rate | Number of pore volumes per injection | Shut in time | Number of injection cycles | Core pressure | Overburden pressure |
| --- | --- | --- | --- | --- | --- |
| 0.5 PV/min | 10 | 14-21 h (overnight) | 2 | 15 bar | 50 bar |

The difference in these three experiments was in the formulation of the two components 1 and 2 injected into the proppant pack 320. The two components were cooled to 5° C. and mixed when entering the proppant pack in the core flooding setup in order to avoid premature precipitation of calcium carbonate.

The experimental values of natural Polish sand proppant, based on 10 experiments, were found to be as shown in Table 4 below.

TABLE 4

| Parameter | Average value | Standard deviation |
|---|---|---|
| Pore volume [mL]: | 23.12 | ±1.56 |
| Porosity [vol. %]: | 33.02 | ±2.23 |
| Density [g/mL]: | 2.304 | ±0.187 |

Experiment 1

The characteristics of the first experiment are described in Table 5 below.

TABLE 5

| Formulation strength | Bentonite | Injection volume (PV) | Injection rate (PV/min) | Number of injections | Core Pressure (bar) | Overburden Pressure (bar) |
|---|---|---|---|---|---|---|
| Half | Yes | 10 | 0.5 | 2 | 15 | 50 |

Figure 12:
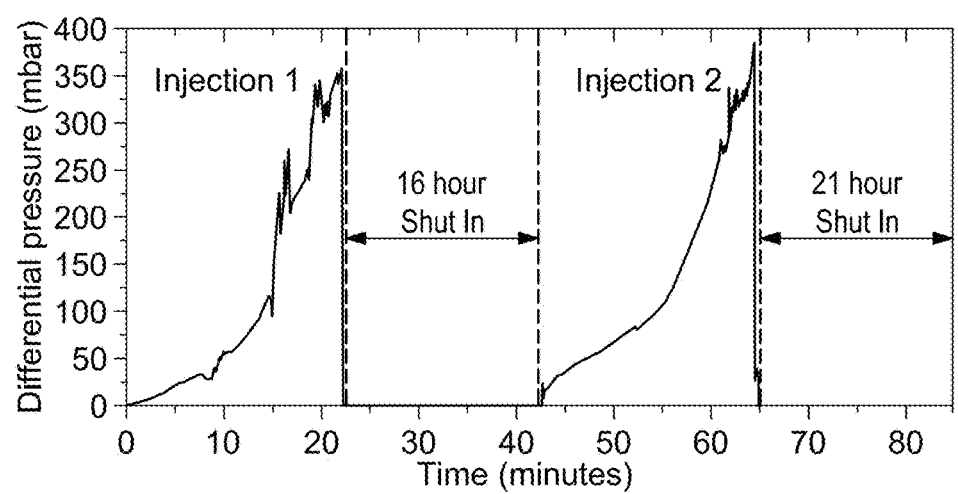
FIG. 12 is a graph of the injection profile showing differential pressure vs. time in respect of experiment 1.

The injection profile for experiment 1 is shown in FIG. 12. During injection 1, the differential pressure increased steadily to a maximum of 356 mbar at the endpoint of the injection. During injection 2, there was a similar development in differential pressure that increased to a maximum of 385 mbar at the endpoint of the injection.

Figure 13:
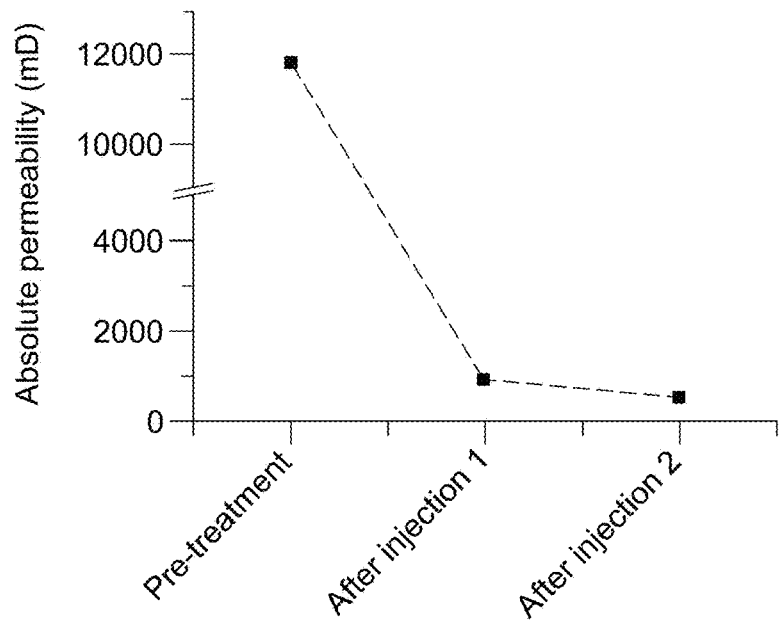
FIG. 13 is a graph showing brine permeability in respect of experiment 1.

The measurements obtained for brine permeability are shown in Table 6 below, and in FIG. 13.

TABLE 6

Experimental values of the permeability of brine at 55° C.

| Solvent | Permeability (mD) | Standard deviation (mD) | Relative value (%) |
|---|---|---|---|
| Pre-treatment at 85° C. | 11830 | ±2613 | 100 |
| After injection 1 | 950 | ±46 | 8.0 |
| After injection 2 | 547 | ±9 | 4.6 |

It can be observed from these results that there was a significant decrease in the permeability after the first treatment cycle to about 8%, while the second treatment reduces the permeability to 4.6%.

Figure 14:
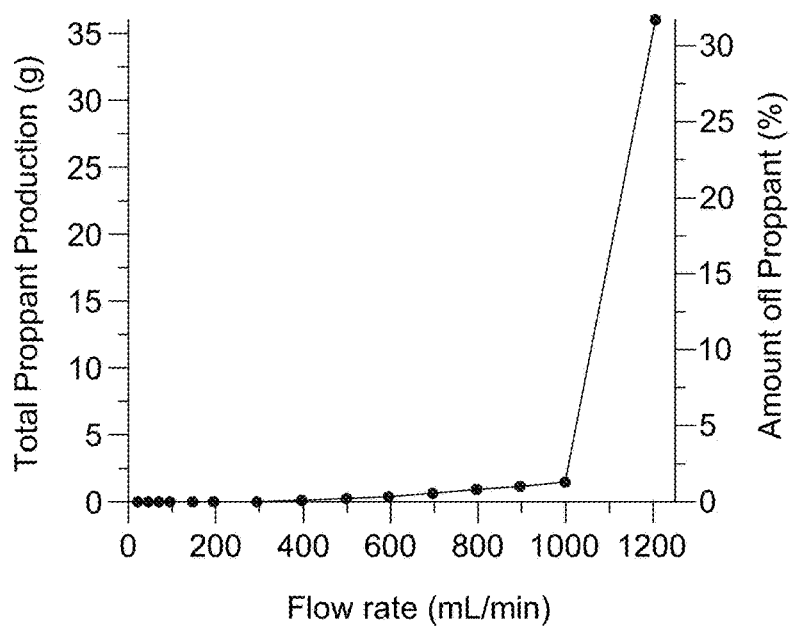
FIG. 14 is a graph showing proppant production in respect of experiment 1.

The proppant pack 320 (still mounted in the Viton® sleeve 308) was fitted with flow restrictor 310 and set up for proppant production measurements. The proppant production (g) vs. flow rate (mLimin) is shown in FIG. 14.

Experiment 2

The characteristics of the second experiment are described in Table 7 below.

TABLE 7

| Formulation strength | Bentonite | Injection volume (PV) | Injection rate (PV/min) | Number of injections | Core Pressure (bar) | Overburden Pressure (bar) |
|---|---|---|---|---|---|---|
| Half | No | 10 | 0.5 | 2 | 15 | 50 |

Figure 15:
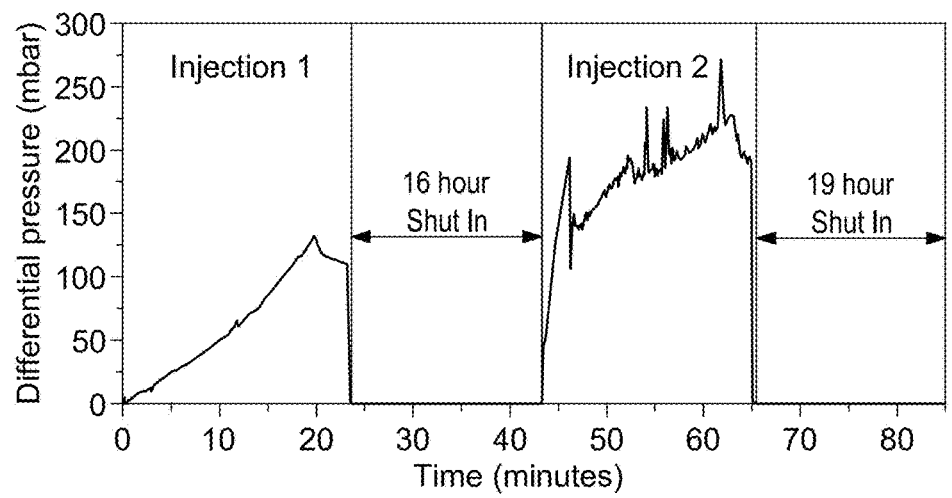
FIG. 15 is a graph of the injection profile showing differential pressure vs time in respect of experiment 2.

The injection profile for experiment 2 is shown in FIG. 15. During injection 1, the differential pressure increased steadily to a maximum of 133 mbar and then dropped to 111 mbar at the endpoint of the injection. During injection 2, there was a similar development in differential pressure that increased to a maximum of 228 mbar and then dropped to 194 mbar at the endpoint of the injection. There were some pressure spikes during injection 2 that caused the differential pressure to reach 271 mbar.

Figure 16:
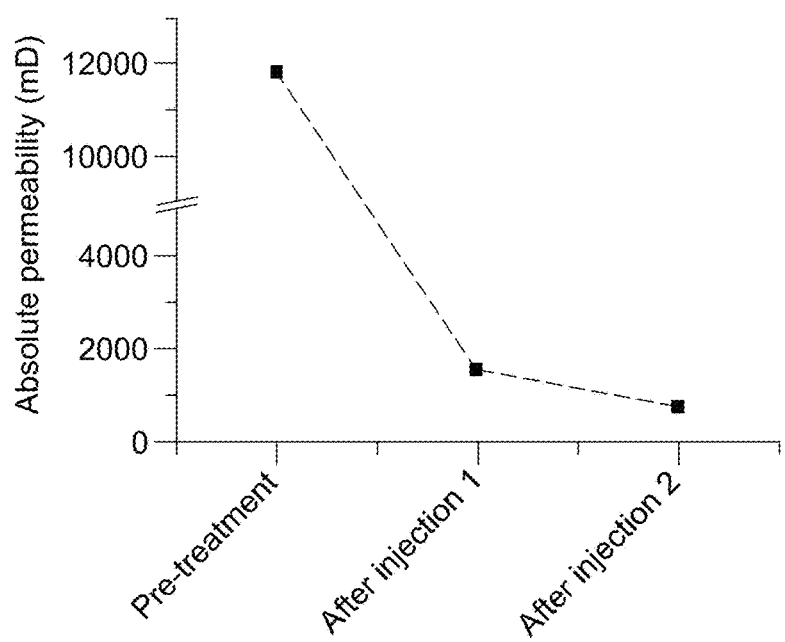
FIG. 16 is a graph showing brine permeability in respect of experiment 2.

The measurements obtained for brine permeability are shown in Table 8 below, and in FIG. 16.

TABLE 8

Experimental values of the permeability of brine at 55° C.

| Solvent | Permeability (mD) | Standard deviation (mD) | Relative value (%) |
|---|---|---|---|
| Pre-treatment at 85° C. | 11830 | ±2613 | 100 |
| After injection 1 | 1558 | ±54 | 13.2 |
| After injection 2 | 769 | ±22 | 6.5 |

It can be observed from these results that there was a decrease in the permeability after the first treatment cycle to about 13.2%, while the second treatment reduces the permeability to 6.5%.

Figure 17:
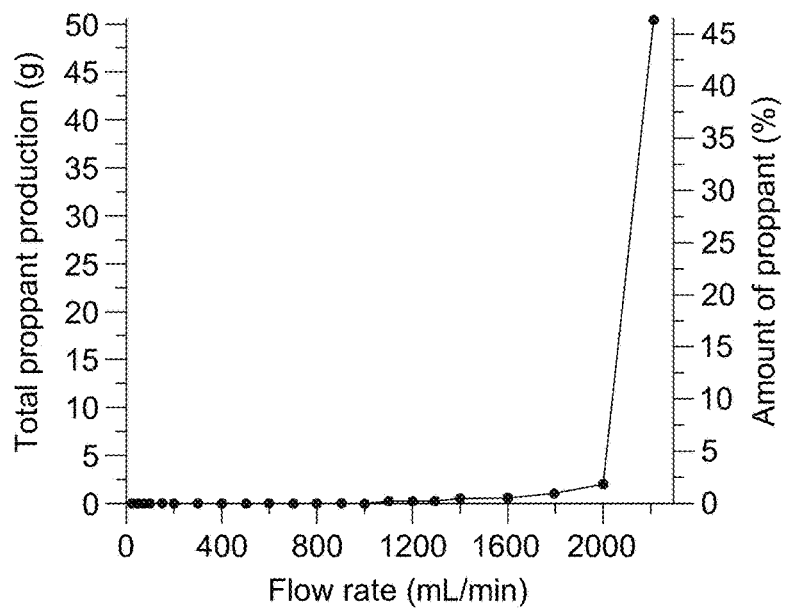
FIG. 17 is a graph showing proppant production in respect of experiment 2.

The proppant pack 320 (still mounted in the Viton® sleeve 308) was fitted with flow restrictor 310 and set up for proppant production measurements. The proppant production (g) vs. flow rate (mL/min) is shown in FIG. 17.

Experiment 3

The characteristics of the second experiment are described in Table 9 below.

TABLE 9

| Formulation strength | Bentonite | Injection volume (PV) | Injection rate (PV/min) | Number of injections | Core Pressure (bar) | Overburden Pressure (bar) |
|---|---|---|---|---|---|---|
| Full | No | 10 | 0.5 | 2 | 15 | 50 |

Figure 18:
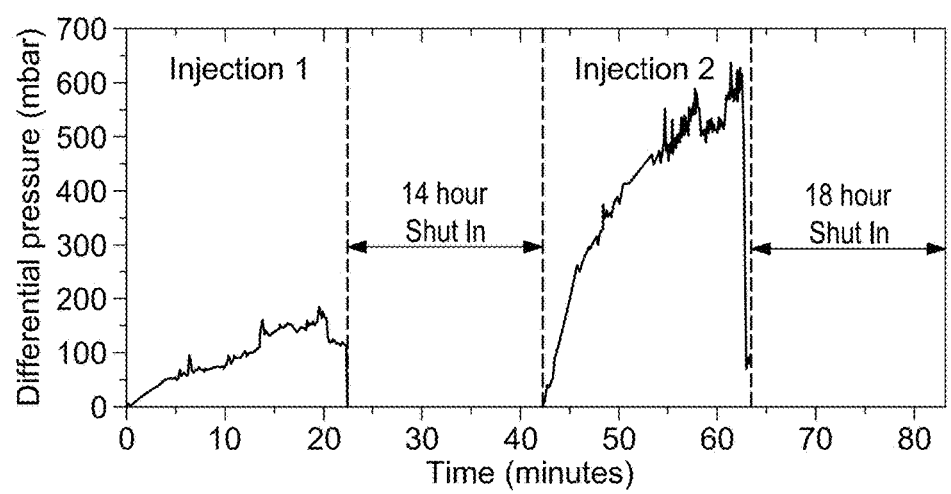
FIG. 18 is a graph of the injection profile showing differential pressure vs time in respect of experiment 3.

The injection profile for experiment 3 is shown in FIG. 18. During injection 1, the differential pressure increased steadily to a maximum of 185 mbar and then dropped to 118 mbar at the endpoint of the injection. During injection 2, there was a steady increase in differential pressure to a maximum of 630 mbar at the endpoint of the injection.

Figure 19:
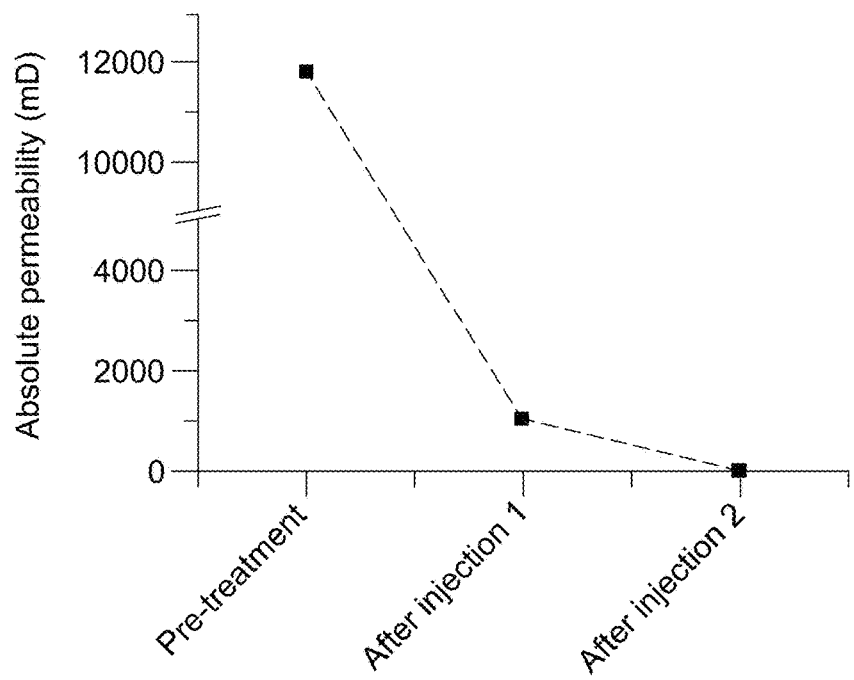
FIG. 19 is a graph showing brine permeability in respect of experiment 3.

The measurements obtained for brine permeability are shown in Table 10 below, and in FIG. 19.

TABLE 10

Experimental values of the permeability of brine at 55° C.

| Solvent | Permeability (mD) | Standard deviation (mD) | Relative value (%) |
|---|---|---|---|
| Pre-treatment at 85° C. | 11830 | ±2613 | 100 |
| After injection 1 | 1025 | ±30 | 8.7 |
| After injection 2 | 14.9 | ±0.6 | 0.1 |

It can be observed from these results that there was a decrease in the permeability after the first treatment cycle to about 8.7%, while the second treatment reduces the permeability to 0.1%.

Figure 20:
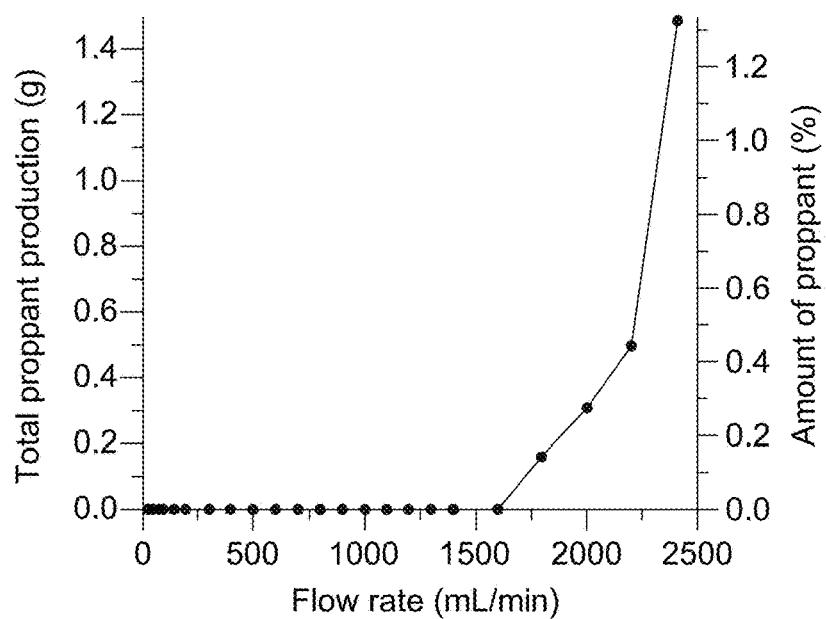
FIG. 20 is a graph showing proppant production in respect of experiment 3.

The proppant pack 320 (still mounted in the Viton® sleeve 308) was fitted with flow restrictor 310 and set up for proppant production measurements. The proppant production (g) vs. flow rate (mL/min) is shown in FIG. 20.

Discussion

In summary, experiment 1 used half concentration of the two components with cationic bentonite. Experiment 2 also used half concentration of the two components, but with no cationic bentonite. Experiment 3 was carried out with no cationic bentonite, but with a full concentration of the two components.

The differential pressure during injections and the brine permeability relates to how densely the calcium carbonate is formed between the proppants. A key parameter of the success of the experiments is the proppant production test, where it is desirable to achieve higher flow rates before failure of proppant consolidation occurs. A combination of having a relatively high permeability and an ability to withstand high flow rate before failure of proppant consolidation, is advantageous.

Figure 21:
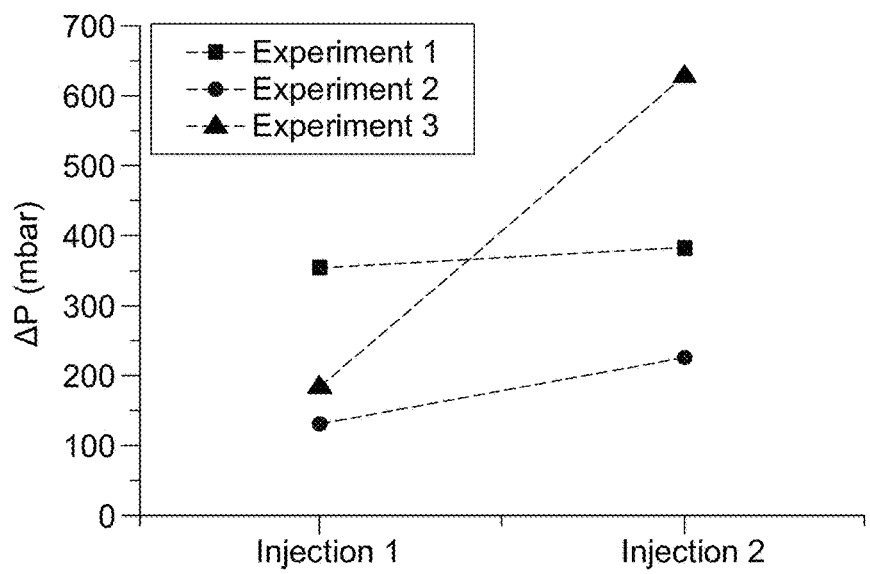
FIG. 21 is a graph showing the maximum differential pressures reached during injection 1 and injection 2 in respect of experiments 1, 2 and 3.

FIG. 21 depicts a graph showing the maximum differential pressures reached during injection 1 and injection 2 of experiments 1, 2 and 3. From the maximum differential pressures during the first injection stage, it appears that the bentonite may act as a plug. The differential pressure is higher than both experiment 2 and 3. This can also be related to a more efficient nucleation of the calcium carbonate that should be the case of experiment 1 with the bentonite present. For the second injection stage there is only a slight increase in differential pressure of experiment 1. This can be explained by the efficient nucleation in the first injection stage, which renders the second stage less efficient. For experiment 3, there is greater increase in the differential pressure of injection 2, which suggest that second stage continues to effectively consolidate the proppant pack at higher concentrations.

Figure 22:
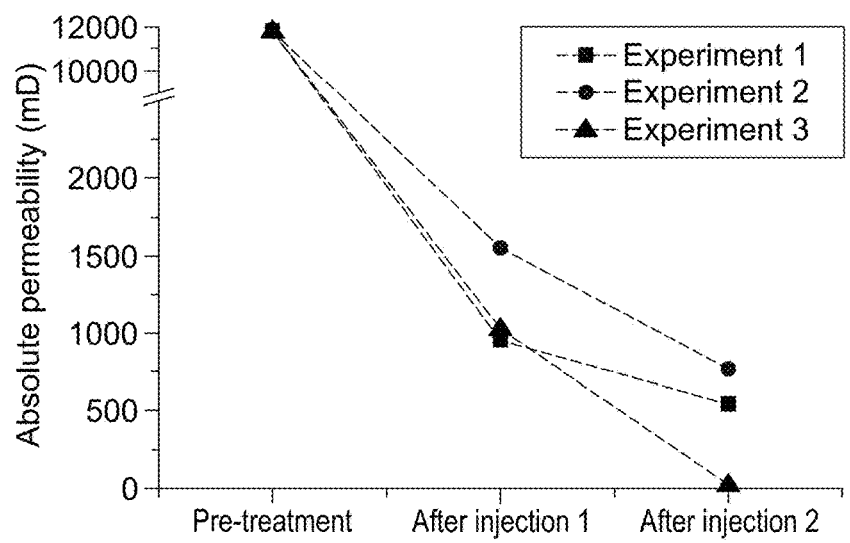
FIG. 22 is a graph showing brine permeability before treatment and after shut in of injections 1 and 2 in respect of experiments 1, 2 and 3.

FIG. 22 is a graph showing brine permeability before treatment and after shut in of injections 1 and 2 in respect of experiments 1, 2 and 3. The brine permeability after the two injection stages correlates well with the maximum differential pressure during the injections. It is apparent that there is a higher degree of plugging overall for experiment 3, while experiment 2 displays the least degree of plugging based on differential pressure and brine permeability.

Figure 23:
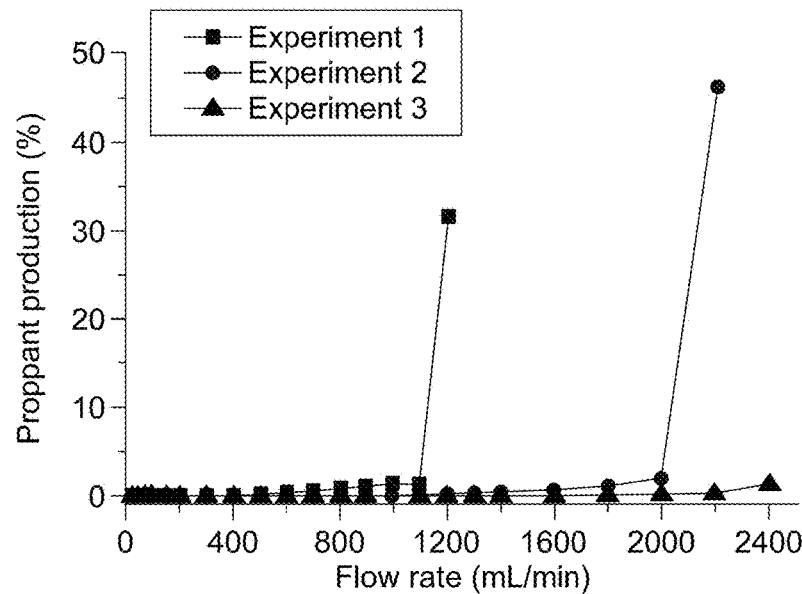
FIG. 23 is a graph showing proppant production in respect of experiments 1, 2 and 3.

FIG. 23 is a graph showing proppant production in respect of experiments 1, 2 and 3. The proppant production test gives direct evidence of the quality of consolidation. Surprisingly, it can be observed that experiment 1 (containing cationic bentonite aggregation promoter) experiences failure at a flow rate of 1200 mL/min corresponding to a velocity at the flow restrictor of 1574.8 mL/min/cm², Experiment 2 which also has the half concentration of the formulation, but without cationic bentonite, reaches a flow of 2200 mL/min (flow restriction velocity of 2887.1 mUmin/cm²) before failing. This indicates that the amount of calcium carbonate precipitation in the proppant pack cannot directly be related to the quality of the proppant consolidation expressed by the flow rate that causes the consolidated proppant pack to be produced. Experiment 3, which also does not contain cationic bentonite, show the highest stability at a flow rate of 2400 mL/min (flow restriction velocity of 3149.6 mL/min/cm²).

The overall results support removing cationic bentonite for a more consolidated precipitation of calcium carbonate. Although it is believed that the cationic bentonite may catalyze the precipitation of calcium carbonate by functioning as the nucleation centre, it may not cause the calcium carbonate to fully enclose the proppants and thus consolidation may be less effective. Experiment 2 and 3 produced less calcium carbonate precipitation in the proppant pack in relation to the concentration of the treatment, but resulted in more consolidated proppant packs during the proppant production test. This may be due to the proppants functioning as the nucleation centre causing the calcium carbonate to better enclose and consolidate the proppant particles.

2) Carbolite™ 20/40 mesh Size

The experimental values of Carbolite™ 20/40, based on 10 experiments, were found to be as shown in Table 11 below.

TABLE 11

| Parameter | Value |
| --- | --- |
| Pore volume [mL]: | 26.8 |
| Porosity [vol. %]: | 38.3 |
| Density [g/mL]: | 2.54 |

Experiment 4

Experiment 4 was carried out using the same procedure described above in paragraphs "set-up" and "method", but using Carbolite™ 20/40 rather than natural Polish sand as the proppant material. The characteristics of the fourth experiment are described in Table 12 below.

TABLE 12

| Formulation strength | Bentonite | Injection volume (PV) | Injection rate (PV/min) | Number of injections | Core Pressure (bar) | Overburden Pressure (bar) |
| --- | --- | --- | --- | --- | --- | --- |
| Half | No | 10 | 0.5 | 2 | 15 | 50 |

Figure 24:
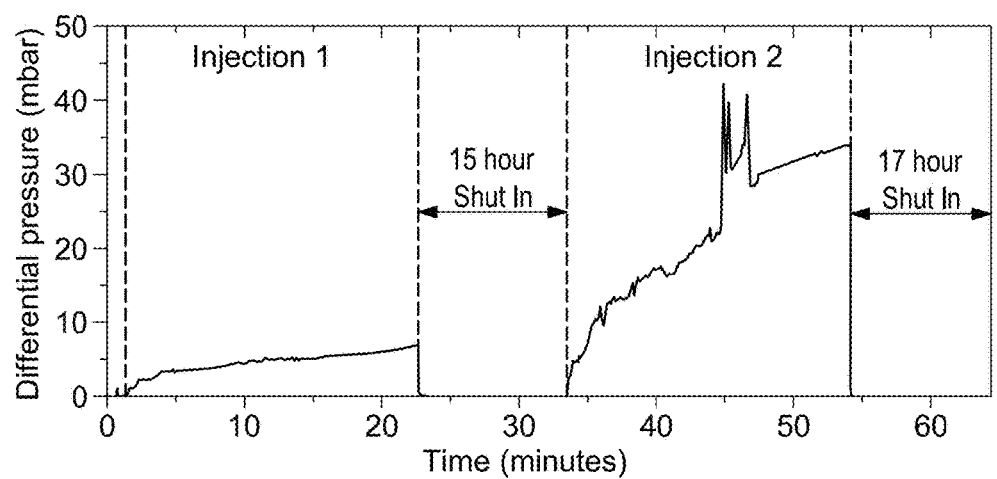
FIG. 24 is a graph of the injection profile showing differential pressure vs time in respect of experiment 4.

The injection profile for experiment 4 is shown in FIG. 24. During injection 1, the differential pressure increased steadily to a maximum of 7 mbar. During injection 2, there was a steady increase in differential pressure with pressure spikes to a maximum of 42 mbar at pressure spike and 34 mbar at the endpoint of the injection.

Figure 25:
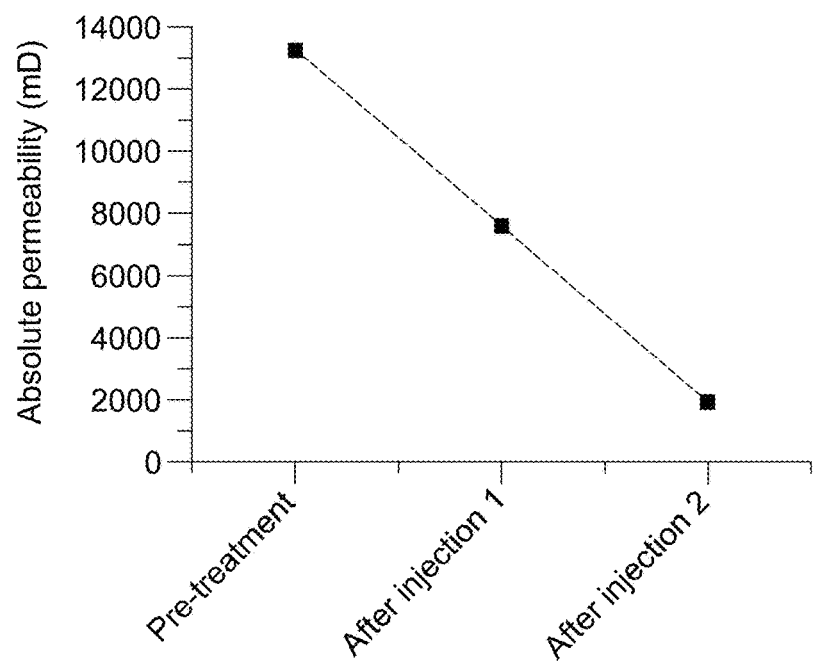
FIG. 25 is a graph showing brine permeability in respect of experiment 4.

The measurements obtained for brine permeability are shown in Table 13 below, and in FIG. 25.

TABLE 13

Experimental values of the permeability of brine at 55° C.

| Solvent | Permeability (mD) | Standard deviation (mD) | Relative value (%) |
| --- | --- | --- | --- |
| Pre-treatment at 85° C. | 13236 | ±261 | 100 |
| After injection 1 | 7448 | ±272 | 56 |
| After injection 2 | 1923 | ±87 | 15 |

It can be observed from these results that there was a gradual decrease in the permeability after the first and the second treatment cycles to about 56% and 15% respectively.

Figure 26:
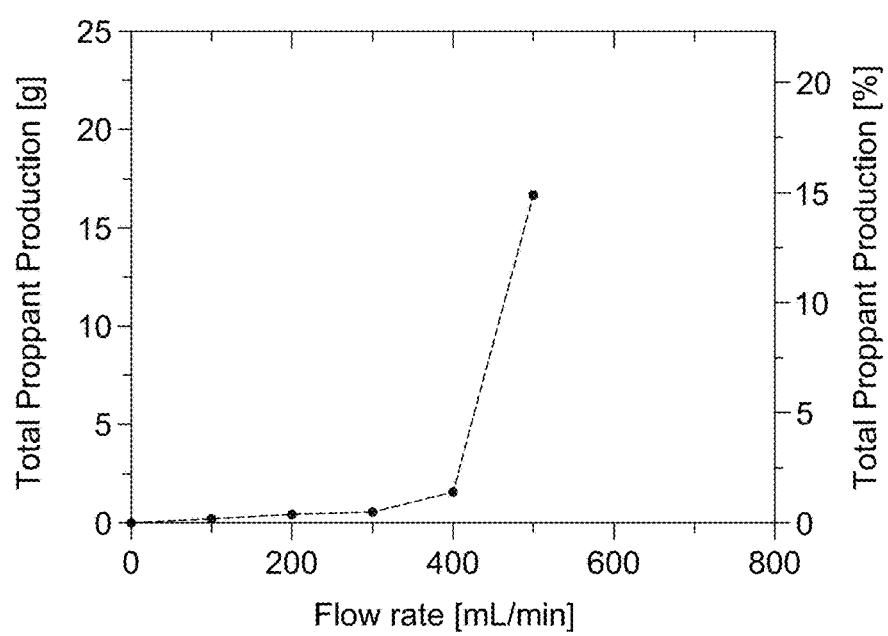
FIG. 26 is a graph showing proppant production in respect of experiment 4.

The proppant pack 320 (still mounted in the Viton® sleeve 308) was fitted with flow restrictor 310 and set up for proppant production measurements. The proppant production (g) vs, flow rate (mL/min) is shown in FIG. 26.

3) Resin-Coated Carbolite™ 20/40 Mesh Size

The experimental values of resin-coated Carbolite™ 20/40, based on 10 experiments, were found to be as shown in Table 14 below,

TABLE 14

| Parameter | Value |
| --- | --- |
| Pore volume [mL]: | 29.1 |
| Porosity [vol. %]: | 41.6 |
| Density [g/mL]: | 2.36 |

Experiment 5

Experiment 5 was carried out using the same procedure as in experiment 4, but using resin-coated Carbolite™ 20/40 as the proppant material. The characteristics of the fourth experiment are described in Table 15 below.

TABLE 15

| Formulation strength | Bentonite | Injection volume (PV) | Injection rate (PV/min) | Number of injections | Core Pressure (bar) | Overburden Pressure (bar) |
|---|---|---|---|---|---|---|
| Half | No | 10 | 0.5 | 2 | 15 | 50 |

Figure 27:
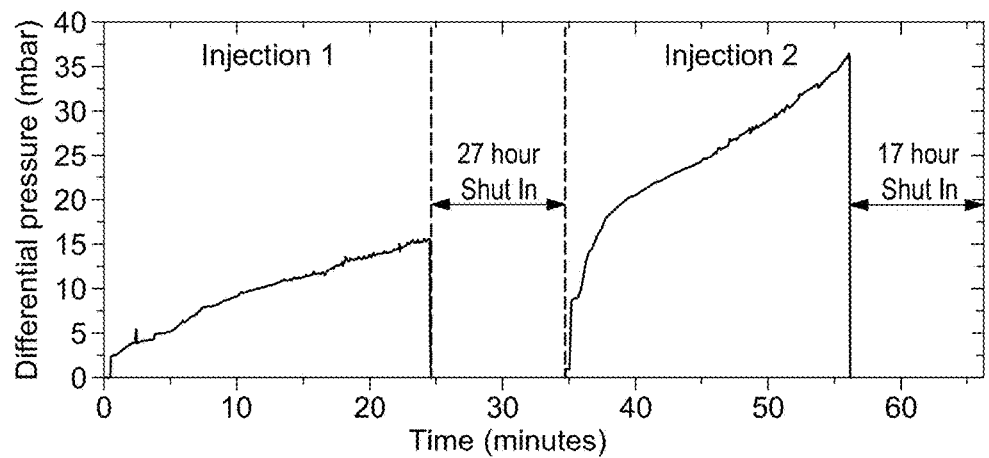
FIG. 27 is a graph of the injection profile showing differential pressure vs time in respect of experiment 5.

The injection profile for experiment 5 is shown in FIG. 27. During injection 1, the differential pressure increased steadily to a maximum of 16 mbar. During injection 2, there was a steady increase in differential pressure to a maximum of 37 mbar at the endpoint of the injection.

Figure 28:
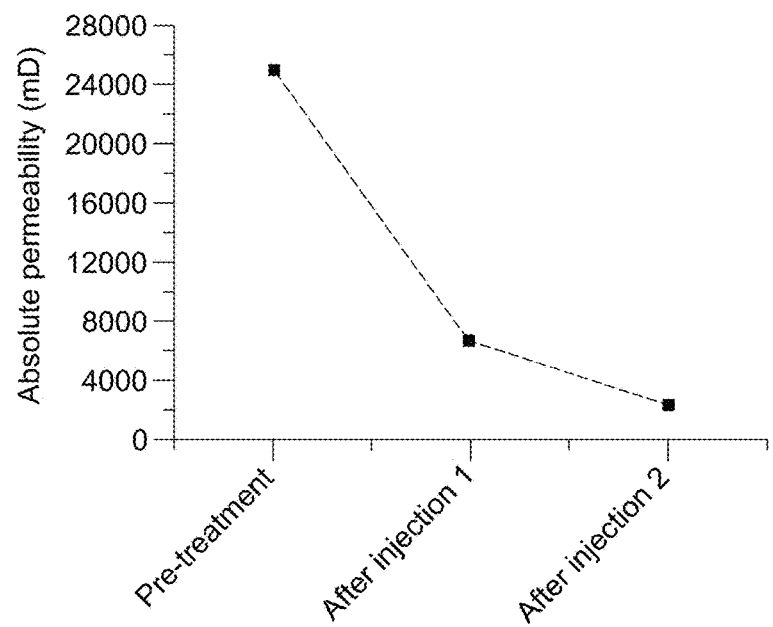
FIG. 28 is a graph showing brine permeability in respect of experiment 5.

The measurements obtained for brine permeability are shown in Table 16 below, and in FIG. 28.

TABLE 16

Experimental values of the permeability of brine at 55° C.

| Solvent | Permeability (mD) | Standard deviation (mD) | Relative value (%) |
|---|---|---|---|
| Pre-treatment at 85° C. | 24921 | ±619 | 100 |
| After injection 1 | 6750 | ±65 | 27 |
| After injection 2 | 2377 | ±37 | 10 |

It can be observed from these results that there was a decrease in the permeability after the first injection cycle to about 27%, and then to about 10% after the second injection cycle.

Figure 29:
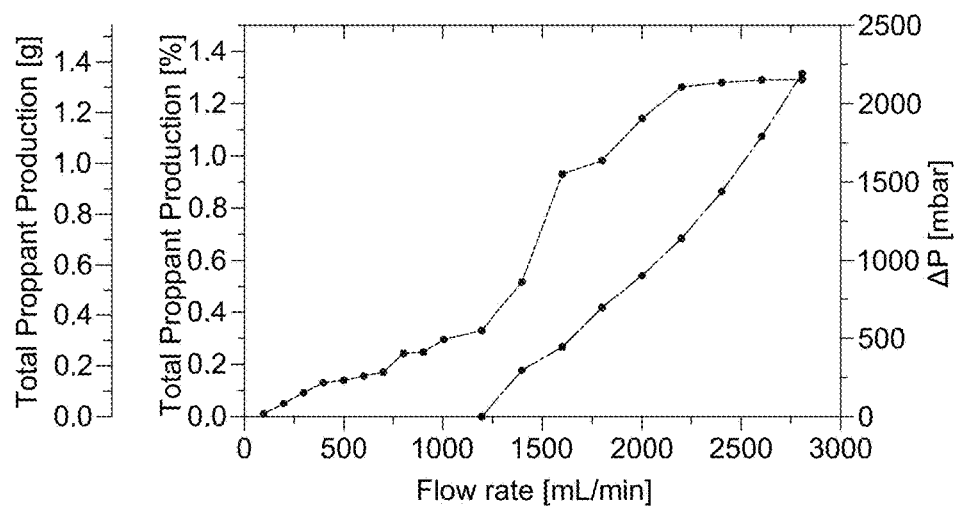
FIG. 29 is a graph showing proppant production in respect of experiment 5.

The proppant pack 320 (still mounted in the Viton® sleeve 308) was fitted with flow restrictor 310 and set up for proppant production measurements. The proppant production (g) vs. flow rate (mL/min) giving both the weight of the proppant and the percentage of the total proppant pack, as well as the pressure build-up within the consolidated proppant pack, is shown in FIG. 29.

Discussion

Based on the results of Experiments 4 and 5, it can be seen that consolidation using the ceramic man-made proppants Carbolite™ 20/40 and resin-coated Carbolite™ 20/40 gave an overall higher permeability after the two injections, as compared to using a natural Polish sand proppant. This trend is also observed in the differential pressure during injections, which is lower for the man-made proppants.

Without wishing to be bound by theory, it is believed that natural Polish sand proppant contains grains of different sizes and geometries, which allows fora better consolidation of the precipitated $CaCO_3$. As compared to ceramic proppants having a more homogeneous shape and size. Carbolite 20/40 consists of spherical grains with a relatively smooth surface, and this is believed to makes it more difficult for the precipitated $CaCO_3$ to adhere to and/or consolidate the grains. However, the consolidated proppants were able to withstand a flow rate of up to 500 mL/min without failure (15% proppant failure at 500 mUmin).

The resin-coated Carbolite 20/40 is a similar type of grain as normal Carbolite 20/40, but it is believed that the resin may cause the grains to adhere to each other as well as providing a rough surface for the precipitated $CaCO_3$ to consolidate. This is observed in the proppant production test, where the consolidated proppant pack did not fail at the maximum flow rate of 2800 mUmin. It is also observed that the provision of a resin coating on proppant particles does not reduce the effectiveness of proppant consolidation.

Various modifications may be made to the embodiment described without departing from the scope of the invention.

The invention claimed is:

1. A method for consolidating a proppant in a formation, the method comprising:
   injecting a composition into the formation, the composition comprising an enzyme, a substrate, and at least one precipitating compound, the enzyme being present in the composition at a concentration of 10-30 g/L and including Jack bean meal, the substrate including urea, the at least one precipitating compound including one or more metal salts;
   reacting the enzyme with the substrate to produce an aqueous carbonate; and
   reacting the aqueous carbonate with the at least one precipitating compound to cause precipitation of a carbonate material to consolidate the proppant in the formation.

2. The method according to claim 1, further comprising consolidating the proppant in situ.

3. The method according to claim 1, further comprising consolidating the proppant in one or more fractures of the formation.

4. The method according to claim 1, further comprising fracturing the formation.

5. The method according to claim 1, further comprising injecting a proppant in the formation.

6. The method according to claim 1, further comprising injecting in the formation the composition after fracturing the formation or after injecting the proppant in the formation.

7. The method according to claim 1, wherein the proppant comprises proppant particles, and further comprising consolidating the proppant particles located nearest a wellbore.

8. The method according to claim 1, wherein the proppant comprises proppant particles, and further comprising consolidating the proppant particles throughout at least one fracture.

9. The method according to claim 1, wherein the proppant comprises proppant particles.

10. The method according to claim 9, wherein the proppant particles comprise grains, beads, balls, or spheres.

11. The method according to claim 1, wherein the proppant comprises or is made from sand, ceramic, glass, metal, or metal alloy.

12. The method according to claim 1, wherein the composition comprises a concentration of the substrate in a range of 50-250 g/L.

13. The method according to claim 1, further comprising mixing the enzyme with the substrate during injection, or immediately before injection.

14. The method according to claim 1, wherein the one or more metal salts include one or more metals selected from aluminium, barium, cadmium, calcium, chromium, cobalt, copper, iron, lead, magnesium, manganese, mercury, nickel, strontium, silver, tin, or zinc.

15. The method according to claim 1, wherein the at least one precipitating compound comprises calcium chloride.

16. The method according to claim 1, wherein the composition comprises a concentration of the at least one precipitating compound in a range of 100-300 g/L.

17. The method according to claim 13, comprising reacting the composition to form a solid precipitate on a surface of proppant particles.

18. The method according to claim 13, wherein the composition further comprises at least one aggregation promoter.

19. The method according to claim 18, wherein the at least one aggregation promoter comprises bentonite or cationic bentonite.

20. The method according to claim 18, wherein the composition comprises a concentration of the at least one aggregation promoter compound in a range of 10-50 g/L.

21. The method according to claim 13, wherein the composition further comprises at least one reinforcing material.

22. The method according to claim 21, wherein the at least one reinforcing material comprises glass fibre.

23. The method according to claim 21, wherein the composition comprises a concentration of the at least one reinforcing material in a range of 1-10 g/L.

24. The method according to claim 13, comprising injecting the composition in the formation at a temperature in a range of between about 20° C. and 80° C.

25. The method according to claim 13, comprising adjusting a pH of the composition to between about 7 and 9.

26. The method according to claim 13, further comprising:
    milling Jack beans to produce the Jack bean meal and subsequently mixing the Jack bean meal with the substrate before the injecting the composition.

27. The method according to claim 26, wherein the milling Jack beans is performed no more than 1 month before at least one of the mixing with the substrate and the injecting the composition.

28. The method according to claim 27, wherein the milling Jack beans is performed no more than 1 week before at least one of the mixing with the substrate and the injecting the composition.

29. The method according to claim 13, wherein the carbonate material is in a form of particles having a diameter in a range of 20-200 µm.

30. A method for fracturing a formation comprising:
    injecting a proppant into the formation; and
    injecting a composition into the formation to consolidate the proppant in situ, the composition comprising an enzyme, a substrate, and at least one precipitating compound, the enzyme being present in the composition at a concentration of 10-30 g/L and including Jack bean meal, the substrate including urea, the at least one precipitating compound including one or more metal salts;
    reacting the enzyme with the substrate to produce an aqueous carbonate; and
    reacting the aqueous carbonate with the at least one precipitating compound to cause precipitation of a carbonate material to consolidate the proppant in the formation.

* * * * *